(12) United States Patent
Numata

(10) Patent No.: US 8,341,633 B2
(45) Date of Patent: *Dec. 25, 2012

(54) IDENTIFYING EXECUTABLE PROCESS CONTENTS OF FLOW EXECUTOR(S) IN FLOW GENERATION SYSTEM

(75) Inventor: Masahito Numata, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/193,270

(22) Filed: Jul. 28, 2011

(65) Prior Publication Data

US 2011/0289505 A1 Nov. 24, 2011

Related U.S. Application Data

(63) Continuation of application No. 11/839,430, filed on Aug. 15, 2007, now Pat. No. 8,127,293.

(30) Foreign Application Priority Data

Aug. 23, 2006 (JP) .................................. 2006-227018

(51) Int. Cl.
*G06F 9/46* (2006.01)

(52) U.S. Cl. ....................................... 718/100; 718/102

(58) Field of Classification Search .................. 718/100, 718/102
See application file for complete search history.

(56) References Cited

U.S. PATENT DOCUMENTS

| | | |
|---|---|---|
| 6,642,943 B1 | 11/2003 | Machida |
| 7,391,917 B2 | 6/2008 | Ohta et al. |
| 7,587,677 B2 | 9/2009 | Yamamoto et al. |
| 7,630,586 B2 | 12/2009 | Yasukaga et al. |
| 7,802,187 B2 | 9/2010 | Yoshida |
| 2004/0223197 A1 | 11/2004 | Ohta et al. |
| 2006/0050307 A1 | 3/2006 | Koike |

FOREIGN PATENT DOCUMENTS

| | | |
|---|---|---|
| JP | 8-287016 A | 11/1996 |
| JP | 2003-256630 A | 9/2003 |

*Primary Examiner* — Van Nguyen
(74) *Attorney, Agent, or Firm* — Rossi, Kimms & McDowell LLP

(57) ABSTRACT

The function restriction information of a designated flow executor is acquired. The acquired function restriction information is analyzed. An operation screen that identifiably displays process contents executable by the flow executor in association with setting target functions to be set in the flow is displayed on the basis of the analyzed function restriction information. Process contents of a setting target function to be set in the flow are selected on the basis of an operation in the operation screen. The flow of the flow executor is generated by combining the functions of the selected process contents.

14 Claims, 16 Drawing Sheets

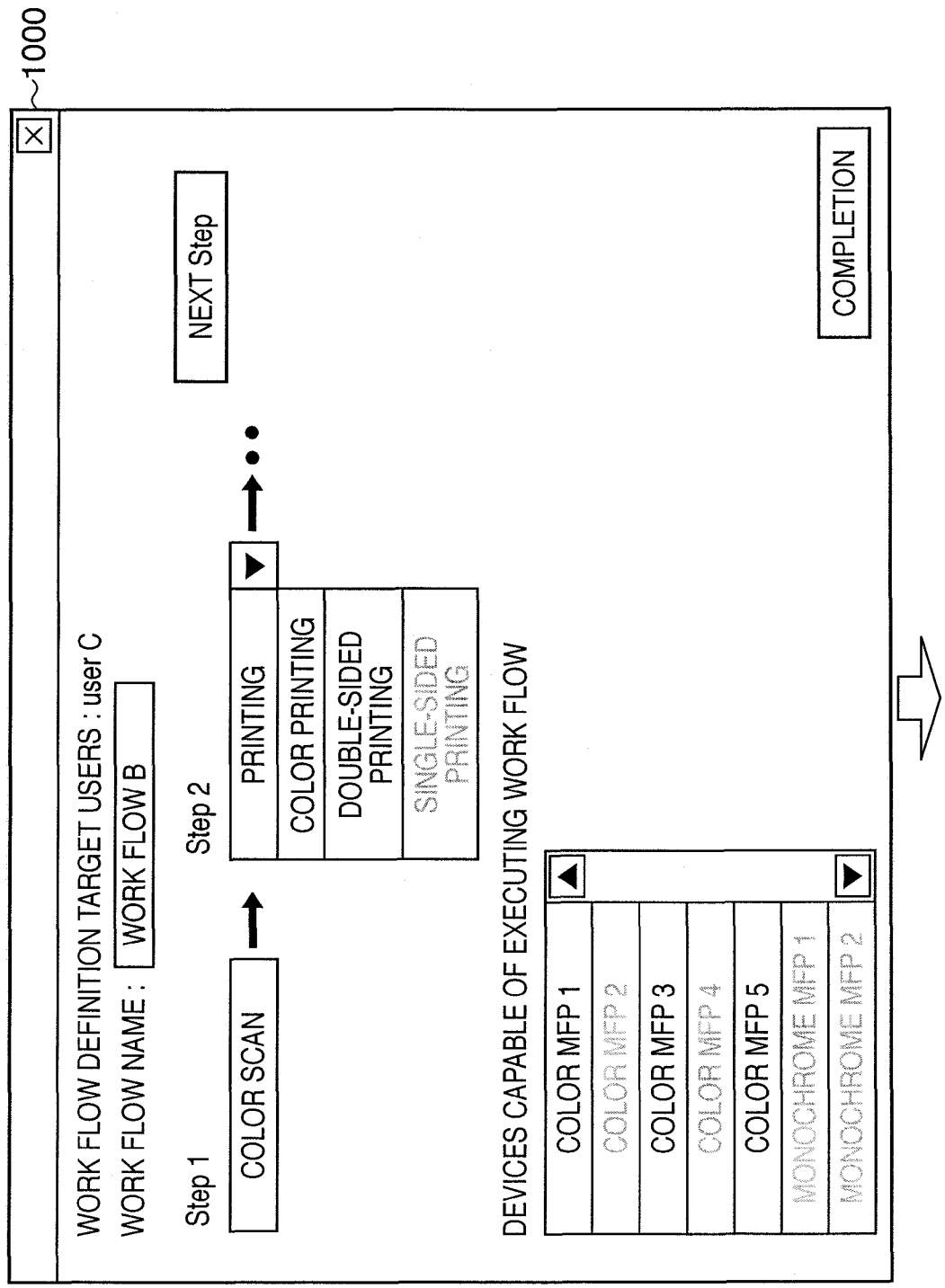

IDENTIFYING EXECUTABLE PROCESS CONTENTS OF FLOW EXECUTOR(S) IN FLOW GENERATION SYSTEM

CROSS REFERENCE TO RELATED APPLICATION

This application is a continuation of U.S. patent application Ser. No. 11/839,430, filed Aug. 15, 2007, now U.S. Pat. No. 8,127,293, issued Feb. 28, 2012, the entire disclosure of which is hereby incorporated herein by reference.

BACKGROUND OF THE INVENTION

1. Field of the Invention

The present invention relates to an information processing apparatus that combines a plurality of functions and generates a flow to execute the plurality of functions as a series of processes, a control method thereof, and a program.

2. Description of the Related Art

It is conventionally possible to combine a plurality of functions (e.g., scanning, copying, and mail sending) of an image forming apparatus, as represented by an MFP (Multi-Function Peripheral), and define a work flow to execute the plurality of functions as a series of processes. This implements a work flow system that allows a work flow executor to execute the plurality of functions of the image forming apparatus by only executing the defined work flow.

There is also practiced a function restriction system which restricts use of functions of an image forming apparatus for each user.

When the two systems are combined, the user specific function restriction of the function restriction system may impede execution of a work flow defined by the work flow system.

Japanese Patent Laid-Open No. 2003-256630 discloses, as a prior art about a work flow and an access right, a technique that allows to set only users who have an access right to process data to be processed by a work flow as a person in charge of the process steps of the work flow defined in advance.

However, the above-described technique of Japanese Patent Laid-Open No. 2003-256630 assumes a circumstance wherein an executor whom a definer wants to request to process the work flow is determined. In such a circumstance, if the executor has no access right to process data to be processed by the work flow, the work flow definer cannot request the executor to process the work flow.

A definer who wants to request a desired executor to process a work flow must define the work flow while comprehending the access right of the executor whom the definer wants to request to process the work flow. This increases the load on the manager. Especially to define work flows for a plurality of executors, the definer must take the access right of each executor into consideration. The fact may make it difficult to define work flows.

SUMMARY OF THE INVENTION

The present invention has been made to solve the above-described problems, and has as its object to provide an information processing apparatus capable of efficiently defining a work flow, a control method thereof, and a program.

According to the first aspect of the present invention, an information processing apparatus which combines a plurality of functions and generates a flow to execute the plurality of functions as a series of processes, comprising:

designation means for designating a flow executor to execute a flow;

acquisition means for acquiring function restriction information representing process contents executable by the flow executor designated by the designation means;

analysis means for analyzing the function restriction information acquired by the acquisition means;

display means for displaying an operation screen that identifiably displays the process contents executable by the flow executor in association with setting target functions to be set in the flow on the basis of the function restriction information analyzed by the analysis means;

selection means for selecting, from the executable process contents, process contents of a setting target function to be set in the flow on the basis of an operation in the operation screen; and generation means for generating the flow of the flow executor by combining the functions of the process contents selected by the selection means.

In a preferred embodiment, the apparatus further comprises:

flow registration means for registering the flow generated by the generation means as the flow of the flow executor; and transmission means for transmitting the flow registered by the registration means to a communicable image forming apparatus.

In a preferred embodiment, the apparatus further comprises acceptance means for accepting input of other process contents in place of certain process contents of the function, wherein the generation means changes the process contents set in the flow to the process contents designated by the acceptance means if the function restriction information of the flow executor changes.

In a preferred embodiment, the apparatus further comprises notification means for notifying a user of change contents if the function restriction information of the flow executor changes.

In a preferred embodiment, the apparatus further comprises:

flow definition method selection means for receiving a selection instruction of a definition method of the flow when the designation means designates a plurality of flow executors, and the analysis means determines that the plurality of flow executors have difference pieces of function restriction information; and analysis screen generation means for generating, on the basis of the flow definition method selected by the flow definition method selection means, an analysis screen that displays an analysis result by the analysis means, wherein the display means displays the screen generated by the analysis screen generation means.

In a preferred embodiment, the analysis screen generation means generates, on the basis of the flow definition method selected by the flow definition method selection means, an analysis screen that identifiably displays process contents executable by the plurality of flow executors designated by the designation means.

In a preferred embodiment, the analysis screen generation means generates, on the basis of the flow definition method selected by the flow definition method selection means, an analysis screen that identifiably displays processes executable by each of groups of flow executors having identical pieces of function restriction information.

In a preferred embodiment, the analysis screen generation means generates, on the basis of the flow definition method selected by the flow definition method selection means, an analysis screen that identifiably displays processes executable by at least one of the plurality of flow executors designated by the designation means.

In a preferred embodiment, the apparatus further comprises:

image forming apparatus selection means for selecting an image forming apparatus to execute the flow;

device configuration information acquisition means for acquiring device configuration information of the image forming apparatus selected by the image forming apparatus selection means; and device configuration information analysis means for analyzing the device configuration information acquired by the device configuration information acquisition means, wherein the display means displays an operation screen that identifiably displays process contents executable by the flow executor and executable by the image forming apparatus selected by the image forming apparatus selection means in association with the setting target functions to be set in the flow on the basis of the function restriction information and the device configuration information.

In a preferred embodiment, the apparatus further comprises image forming apparatus registration means for registering the image forming apparatus selected by the image forming apparatus selection means as an image forming apparatus to execute the flow generated by the generation means.

In a preferred embodiment, the apparatus further comprises:

device configuration information acquisition means for acquiring device configuration information of at least one image forming apparatus; and device configuration information analysis means for analyzing the device configuration information acquired by the device configuration information acquisition means, wherein the display means displays an operation screen that identifiably displays the process contents executable by the flow executor and the image forming apparatus capable of executing the setting target functions to be set in the flow in association with the setting target functions to be set in the flow on the basis of the function restriction information and the device configuration information.

In a preferred embodiment, the apparatus further comprises image forming apparatus registration means for registering the image forming apparatus displayed on the operation screen as an image forming apparatus to execute the flow generated by the generation means upon receiving a generation instruction by the generation means.

According to the second aspect of the present invention, a control method of an information processing apparatus which combines a plurality of functions and generates a flow to execute the plurality of functions as a series of processes, comprising the steps of:

designating a flow executor to execute a flow;

acquiring function restriction information representing process contents executable by the flow executor designated in the designating step;

analyzing the function restriction information acquired in the acquiring step;

displaying an operation screen that identifiably displays the process contents executable by the flow executor in association with setting target functions to be set in the flow on the basis of the function restriction information analyzed in the analyzing step;

selecting, from the executable process contents, process contents of a setting target function to be set in the flow on the basis of an operation in the operation screen; and generating the flow of the flow executor by combining the functions of the process contents selected in the selecting step.

According to the third aspect of the present invention, a computer program which is stored in a computer-readable storage medium to cause a computer to execute control of an information processing apparatus which combines a plurality of functions and generates a flow to execute the plurality of functions as a series of processes, by causing the computer to execute the steps of:

designating a flow executor to execute a flow;

acquiring function restriction information representing process contents executable by the flow executor designated in the designating step;

analyzing the function restriction information acquired in the acquiring step;

displaying an operation screen that identifiably displays the process contents executable by the flow executor in association with setting target functions to be set in the flow on the basis of the function restriction information analyzed in the analyzing step;

selecting, from the executable process contents, process contents of a setting target function to be set in the flow on the basis of an operation in the operation screen; and generating the flow of the flow executor by combining the functions of the process contents selected in the selecting step.

Further features of the present invention will become apparent from the following description of exemplary embodiments, with reference to the attached drawings.

BRIEF DESCRIPTION OF THE DRAWINGS

FIGS. 11A through 11C are views showing an example of a work flow generation screen in selecting, as a work flow distribution destination, an arbitrary image forming apparatus capable of executing a work flow according to the embodiment of the present invention;

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
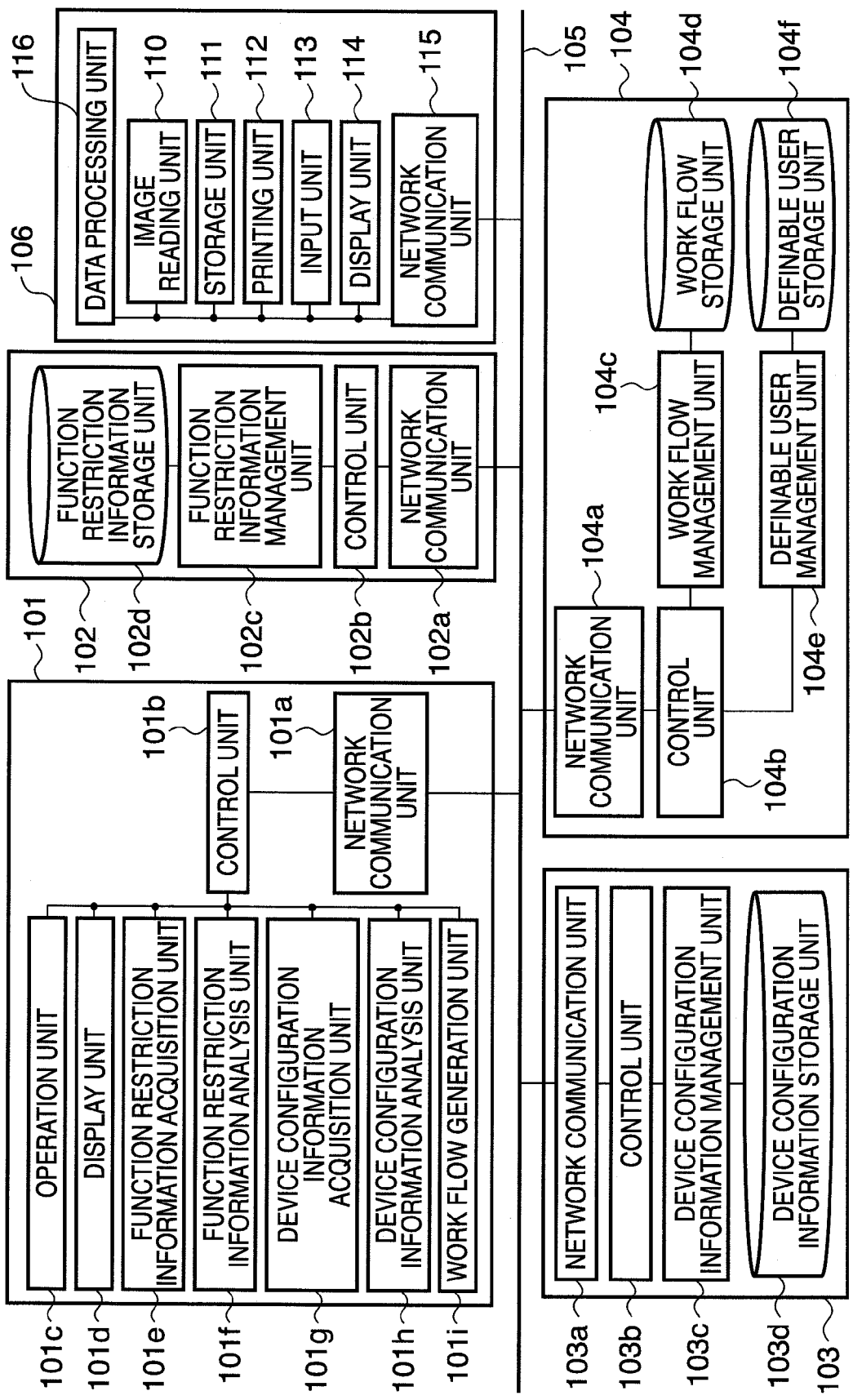
FIG. 1 is a block diagram showing the overall arrangement of a work flow management system under the function restriction environment of an image forming apparatus according to an embodiment of the present invention.

FIG. 1 is a block diagram showing the overall arrangement of a work flow management system according to the embodiment of the present invention.

Referring to FIG. 1, a client PC (personal computer) 101, serving as an information processing apparatus, a first server 102, a second server 103, and a third server 104, serving as information processing apparatuses, and an image forming apparatus 106, are connected via a network 105. The client PC 101 can combine a plurality of functions and generate a flow to execute the plurality of functions as a series of processes, as will be described hereinafter.

The network 105 is typically one of, e.g., the Internet, a LAN, a WAN, a telephone line, a dedicated digital line, an ATM, a frame relay line, a communication satellite channel, a cable TV network, or a data broadcasting radio channel. The network 105 is a so-called communication network implemented by combining the technologies, and need only be able to transmit/receive data.

Each of the client PC 101 and the servers 102 through 104 has standard constituent elements of a general-purpose computer. The constituent elements include, e.g., a CPU, RAM, ROM, a hard disk, an external storage device, a network interface, a display, a keyboard, and a mouse. Each of the client PC 101 and the servers 102 through 104 reads out and executes a control program from the ROM, thereby implementing various kinds of processes, including the processes shown in the flowcharts to be described hereinafter.

The image forming apparatus 106 is, e.g., an MFP serving as a multi-function apparatus that implements a plurality of kinds of functions. In the image forming apparatus 106, an image reading unit 110, including a document table and an auto document feeder (ADF), irradiates one or a bundle of document images with a light source (not shown), and forms a document reflection image on a solid-state image sensing element through a lens. The image reading unit 110 obtains, from the solid-state image sensing element, a raster-like image reading signal as a raster image with a predetermined density (e.g., 600 DPI).

The image forming apparatus 106 also has a copy function of causing a printing unit 112 to print an image corresponding to the image reading signal on a printing medium. In particular, to copy one document image, a data processing unit 116 processes the image reading signal to generate a print signal, and the printing unit 112 prints it on a printing medium. On the other hand, to copy a plurality of document images, a storage unit 111 holds several print signals, and then, the printing unit 112 sequentially outputs and prints the print signals on a printing medium.

A print signal output from the client PC 101 is received by the data processing unit 116 via the network 105 and a network communication unit 115. The data processing unit 116 converts the print signal into raster data that is printable by the printing unit 112. Thereafter, the printing unit 112 prints the raster data on a printing medium.

An operator instruction to the image forming apparatus 106 is input from a key operation unit provided on the image forming apparatus 106 and an input unit 113, including a keyboard and a mouse. A control unit (not shown) in the data processing unit 116 controls the series of operations. A display unit 114 displays an operation input state and image data during a process.

The image forming apparatus 106 has a plurality of functions, including scan, printing, mail sending, saving in a storage unit (e.g., HDD), FAX, and access to a document management server, and can place function restrictions on each user.

The operation of the work flow management system in FIG. 1 will be described next.

A work flow definer (e.g., a superior or a manager) executes user authentication and designates a work flow executor (e.g., a subordinate) by using a display unit 101d and an operation unit 101c of the client PC 101. Then, a function restriction information acquisition unit 101e transmits a function restriction information acquisition request to acquire the function restriction information of the work flow executor to the first server 102 via a network communication unit 101a and the network 105, under the control of a control unit 101b.

Before transmitting the function restriction information acquisition request, the client PC 101 transmits the user information of the work flow definer and the information of the designated work flow executor to the third server 104 under the control of the control unit 101b.

The first server 102 causes a network communication unit 102a to receive the function restriction information acquisition request from the client PC 101 under the control of a control unit 102b. On the basis of the request, the first server 102 causes a function restriction information management unit 102c to refer to a function restriction information storage unit 102d and transmit the function restriction information of the designated work flow executor to the client PC 101. The function restriction information can have any format.

The function restriction information storage unit 102d stores the function restriction information of each user who serves as a work flow executor. The function restriction information contains, e.g., information representing ON/OFF of use of various kinds of functions of the image forming apparatus 106, and the use count of each function.

When the function restriction information acquisition unit 101e receives the function restriction information from the first server 102, the client PC 101 causes a function restriction information analysis unit 101f to analyze the function restriction information.

The work flow definer designates an image forming apparatus to execute a work flow by using the display unit 101d and the operation unit 101c of the client PC 101. The client PC 101 causes a device configuration information acquisition unit 101g to transmit a device configuration information acquisition request to acquire the device configuration information of the designated image forming apparatus to the second server 103, via the network communication unit 101a and the network 105.

The second server 103 causes a network communication unit 103a to receive the device configuration information acquisition request from the client PC 101. On the basis of the request, the second server 103 causes a device configuration information management unit 103c to refer to a device configuration information storage unit 103d, and transmit the device configuration information of the designated image forming apparatus to the client PC 101.

The device configuration information storage unit 103d stores the device configuration information of each image forming apparatus connected to the network 105. The device configuration information contains, e.g., information representing various kinds of functions of the image forming apparatus 106.

According to the embodiment, the client PC 101 transmits the device configuration information acquisition request to the second server 103. However, the present invention is not limited thereto. For example, the client PC 101 may transmit the device configuration information acquisition request directly to the designated image forming apparatus. Alternatively, the client PC 101 may include the arrangement of the second server 103 and manage the device configuration information in itself.

When the network communication unit 101a receives the device configuration information from the second server 103, the client PC 101 causes a device configuration information analysis unit 101h to analyze the device configuration information.

The client PC 101 displays, on the display unit 101d, work flow process steps on the basis of the analysis results of the function restriction information analysis unit 101f and the device configuration information analysis unit 101h. Of the processes to be executed in the process steps, processes executable by the work flow executor and processes executable by the image forming apparatus are identifiably displayed on the display unit 101d. When the work flow definer selects process steps by using the operation unit 101c, a work flow generation unit 101i generates a work flow on the basis of the selection. The client PC 101 transmits a work flow registration request to the third server 104 via the network communication unit 101a and network 105.

When a network communication unit 104a receives the work flow registration request from the client PC 101, the third server 104 causes a work flow management unit 104c to register the work flow of the work flow executor as a registration target in a work flow storage unit 104d.

According to the embodiment, the client PC 101 generates the work flow. However, the information processing apparatus may be a server, and another client PC may access the server and generate and register a work flow. The client PC 101 may include the third server 104. Alternatively, the first server 102 to third server 104 may be formed from one server.

An example of a work flow executor designation screen displayed on the client PC 101 will be described next, with reference to FIG. 2.

Figure 2:
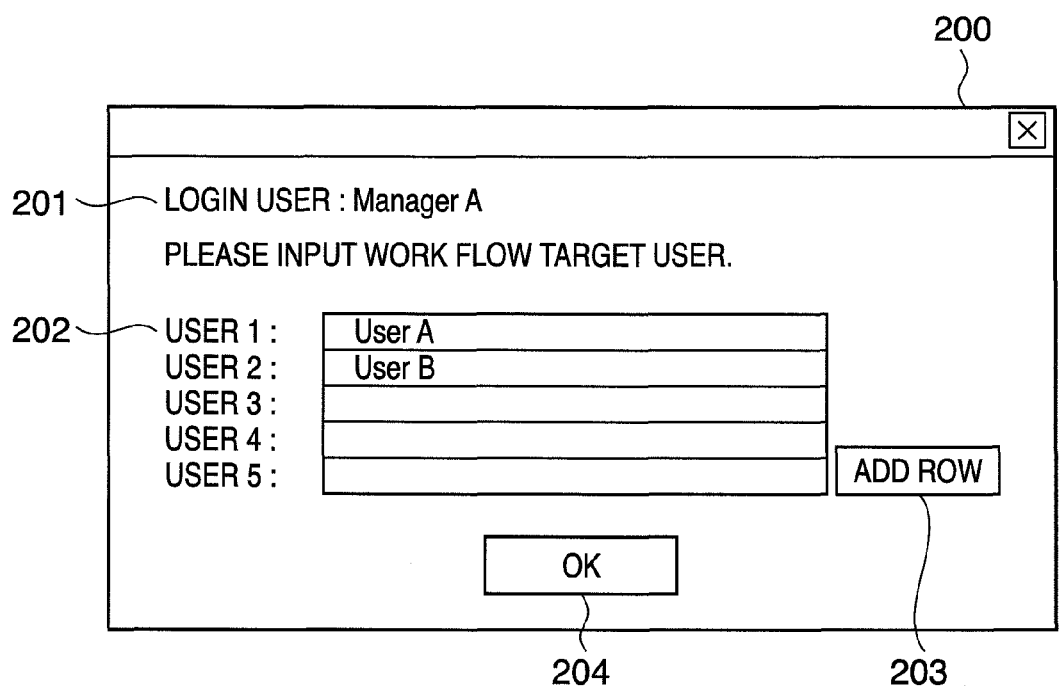
FIG. 2 is a view showing an example of a work flow executor designation screen that is displayed on a client PC according to the embodiment of the present invention.

FIG. 2 is a view showing an example of a work flow executor designation screen displayed on the client PC according to the embodiment of the present invention.

A work flow executor designation screen 200 shown in FIG. 2 is generated by the control unit 101b of the client PC 101, and displayed on the display unit 101d. Operations (e.g., selection instruction and determination instruction) for various operation screens displayed on the display unit 101d are implemented by operating a pointer, such as a cursor or a caret, which is displayed on screen by using the keyboard or the mouse of the client PC 101.

In the work flow executor designation screen 200, a work flow definer display part 201 displays the information of the work flow definer. The information includes, e.g., the user name upon login to the client PC 101. Alternatively, before the work flow executor designation screen 200, a work flow definer authentication screen may be displayed in a work flow generation application running on the client PC 101. The work flow definer information may include the user name upon login on the screen 200.

The work flow definer designates a work flow executor in a work flow executor input part 202. It is possible to designate a plurality of users at once in the work flow executor input part 202. Alternatively, in user authentication by the work flow definer, the list information of users definable by the work flow definer may be acquired from the third server 104, and the work flow executor input part 202 may select users from the definable user list.

An "add row" button 203 adds the work flow executor input part 202 to the work flow executor designation screen 200.

An OK button 204 determines the work flow executor. When the work flow definer clicks on the OK button 204, the client PC 101 determines as user information each work flow executor (user) input in the work flow executor input part 202, and stores the user information in the RAM. On the basis of the user information stored in the RAM, the client PC 101 transmits a function restriction information acquisition request to acquire the function restriction information of the designated user to the first server 102, via the network communication unit 101a. Thus, the client PC 101 designates a work flow executor to execute a flow in accordance with instructions input via the screen in FIG. 2.

An example of a function restriction information analysis screen displayed when a plurality of users with identical pieces of function restriction information are selected via the work flow executor designation screen 200 will be described next, with reference to FIG. 3.

Figure 3:
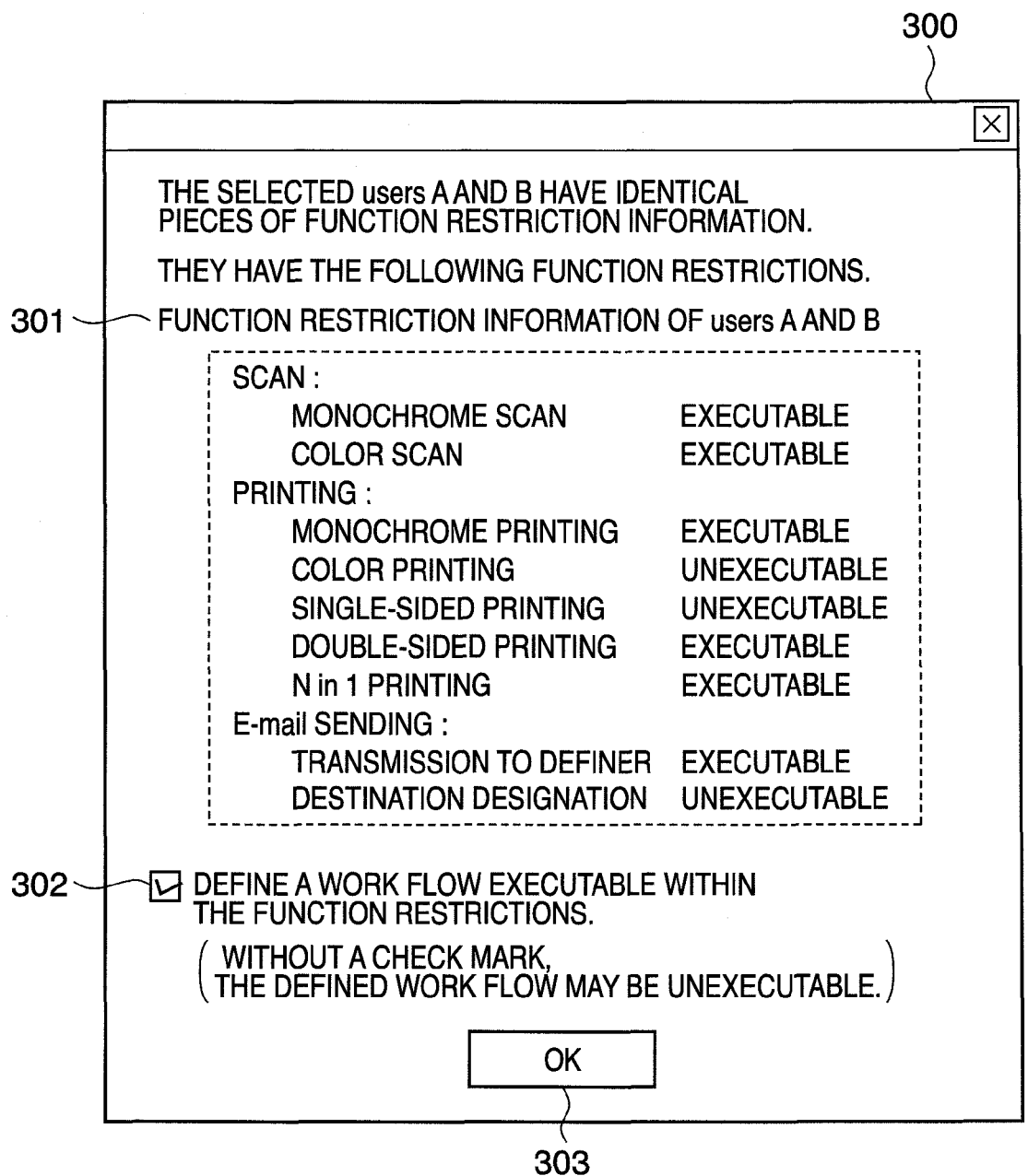
FIG. 3 is a view showing an example of a function restriction information analysis screen that is displayed when a plurality of users with identical pieces of function restriction information are selected in the work flow executor designation screen according to the embodiment of the present invention.

FIG. 3 is a view showing an example of a function restriction information analysis screen displayed when a plurality of users with identical pieces of function restriction information are selected in the work flow executor designation screen according to the embodiment of the present invention.

A function restriction information analysis screen 300 shown in FIG. 3 is generated by the control unit 101b of the client PC 101 on the basis of the analysis result of the function restriction information analysis unit 101f and displayed on the display unit 101d. The foregoing also applies to screens shown in FIGS. 4 through 11 (to be described hereinafter). When one user is selected in the work flow executor designation screen 200 in FIG. 2, a function restriction information analysis screen is displayed, the content thereof essentially identical to the content shown in FIG. 3.

In the function restriction information analysis screen 300, a function restriction information display part 301 displays the function restriction information of the plurality of users with identical pieces of function restriction information. According to the embodiment, function restriction can be set for each user in association with scan, printing, and mail sending of the functions of the image forming apparatus. However, the present invention is not limited to this. For example, the function restriction target can also include other functions of the image forming apparatus, such as HDD saving, FAX, and access to a document management server, as a matter of course.

A function restriction information reflection check box 302 explicitly indicates that the work flow definer will define a work flow within the function restriction information of the work flow executor. If the check box is checked, a characteristic feature of the present invention, i.e., the work flow definition reflecting the function restriction information of each user, is possible. According to the embodiment, a check box is used. However, if the setting is always reflected, the check box can be omitted.

The work flow definer clicks on an OK button 303 upon confirming the function restriction information of the work flow executor. When the work flow definer clicks on the OK button 303, a designation method selection screen in FIG. 8 (to be described later) is displayed. If the function restriction information reflection check box 302 has a check mark, the check state is stored in the RAM.

An example of a work flow definition method selection screen displayed when a plurality of users with different pieces of function restriction information are selected in the work flow executor designation screen 200 will be described next, with reference to FIG. 4.

Figure 4:
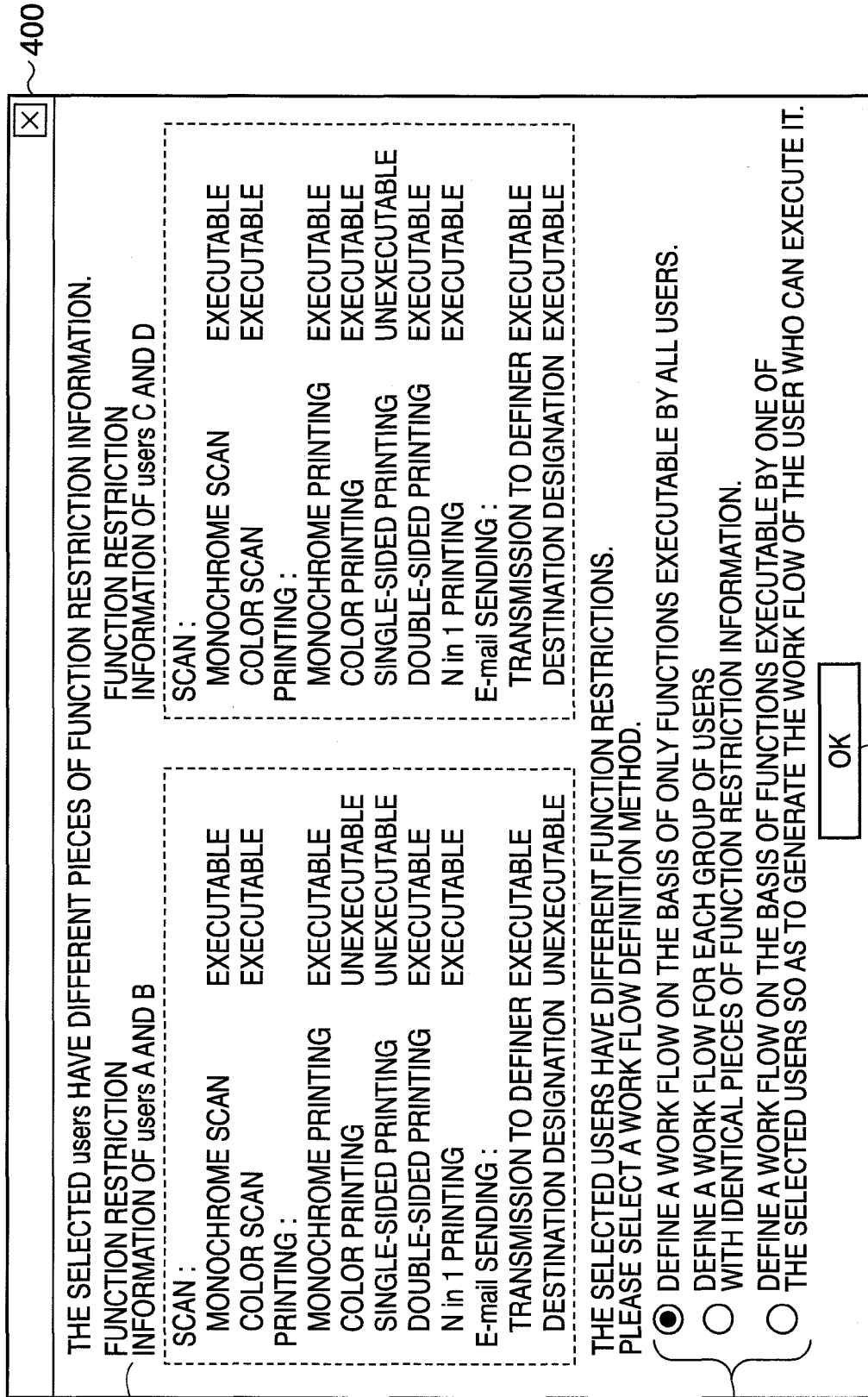
FIG. 4 is a view showing an example of a work flow definition method selection screen that is displayed when a plurality of users with different pieces of function restriction information are selected in the work flow executor designation screen according to the embodiment of the present invention.

FIG. 4 is a view showing an example of a work flow definition method selection screen displayed when a plurality of users with different pieces of function restriction information are selected in the work flow executor designation screen according to the embodiment of the present invention.

In a work flow definition method selection screen 400, a function restriction information display part 401 displays the function restriction information of each of users with difference pieces of function restriction information.

In a work flow definition method selection part 402, the work flow definer selects how to define a work flow (work flow definition method) if the designated work flow executors have different pieces of function restriction information. According to the embodiment, one of the following three items is selectable:

"Define a work flow on the basis of only functions executable by all users";

"Define a work flow for each group of users with identical pieces of function restriction information"; or "Define a work flow on the basis of functions executable by one of the selected users so as to generate the work flow of the user who can execute the work flow".

The work flow definition methods have the following effects;

First, a use case can be considered in which the work flow definer wants to efficiently set a work flow and cause a designated work flow executor to properly execute it while allowing restrictions on work flow process steps to some extent. The present use case can be achieved by selecting the work flow definition method "Define a work flow on the basis of only functions executable by all users".

Another use case is conceivable in which the work flow definer wants to efficiently generate a work flow for a designated executor and make the work flow contain functions permitted by the function restriction information as many as possible. In such a circumstance, the definition method "Define a work flow for each group of users with identical pieces of function restriction information" is selected. This makes it possible to reflect the function restriction information of each user as much as possible and efficiently execute steps that permit efficient execution.

That is, in the method "Define a work flow on the basis of only functions executable by all users", it is necessary to assume the function restriction information of each of users A, B, C, and D in FIG. 4. However, in the method "Define a work flow for each group of users with identical pieces of function restriction information", a work flow is generated for each of the group of users A and B and the group of users C and D. It is therefore possible to generate work flows under relaxed function restrictions as compared to the former case.

Still another use case can be considered in which in defining a work flow, the work flow definer wants to at least one of the selected work flow executors to execute a work flow while neglecting the function restriction information. In such a circumstance, the definition method is "Define a work flow on the basis of functions executable by one of the selected users so as to generate the work flow of the user who can execute it". This allows the work flow definer to efficiently define a work flow without being conscious of the function restriction information of each work flow executor.

When the work flow definer can select the three work flow definition methods, a work flow definition method appropriate for a use case assumed by the work flow definer can be selected.

The work flow definer clicks on an OK button 403 upon confirming the function restriction information of each user and selecting a work flow definition method. When the work flow definer clicks on the OK button 403, information representing the selected work flow definition method is stored in the RAM.

Figure 5:
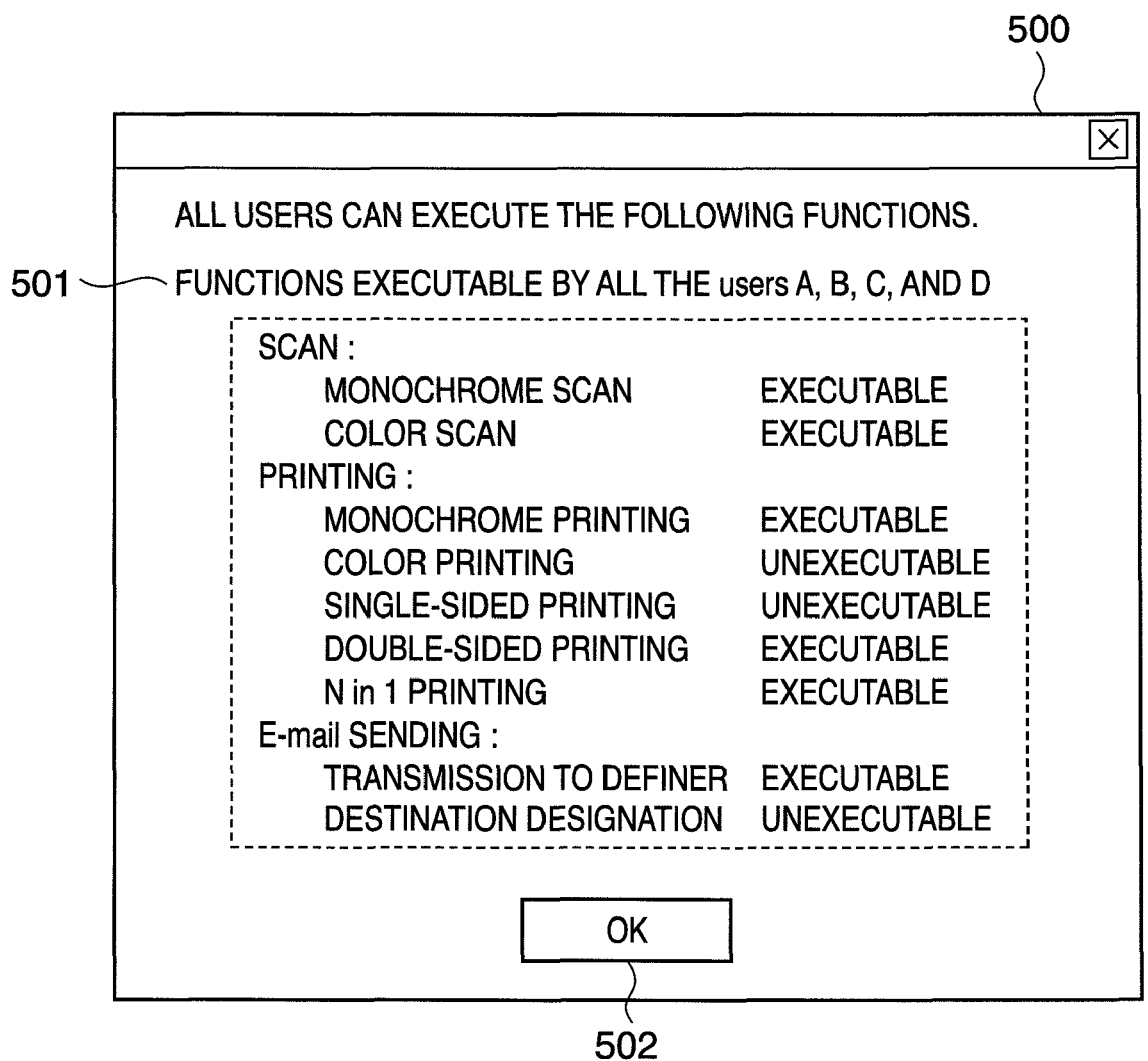
FIG. 5 is a view showing an example of a function restriction information analysis screen in defining a work flow that is executable by all work flow executors according to the embodiment of the present invention.

When the work flow definer selects "Define a work flow on the basis of only functions executable by all users" in the work flow definition method selection part 402 and clicks on the OK button 403, a function restriction information analysis screen 500 shown in FIG. 5 is displayed.

In the function restriction information analysis screen 500, a function restriction information display part 501 displays the function restriction information representing functions executable by all users designated in the work flow executor designation screen 200 (FIG. 2). According to the embodiment, on the basis of the function restriction information of the users A, B, C, and D in FIG. 4, functions executable by all the users are displayed. For example, color printing is permitted for the users C and D, but inhibited for the users A and B. Hence, color printing is displayed as "unexecutable". Similarly, single-sided printing and destination designation of E-mail sending are also displayed as "unexecutable", because these functions are not executable by all users.

The work flow definer clicks on an OK button 502 upon confirming the functions executable by all users. When the work flow definer clicks on the OK button 502, the designation method selection screen in FIG. 8 to be described later is displayed.

Figure 6:
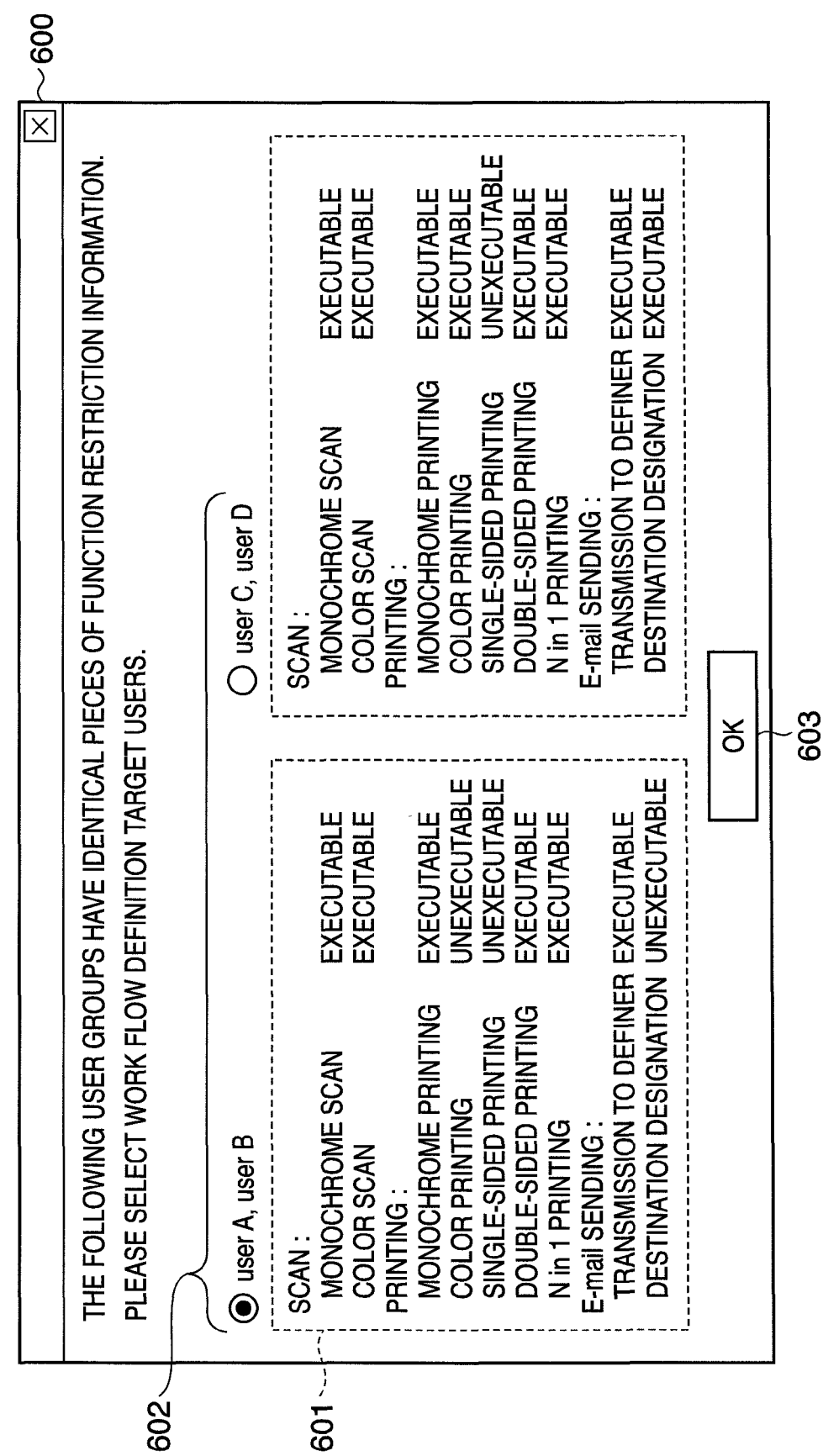
FIG. 6 is a view showing an example of a function restriction information analysis screen in defining a work flow for each user with identical pieces of function restriction information according to the embodiment of the present invention.

When the work flow definer selects "Define a work flow for each group of users with identical pieces of function restriction information" in the work flow definition method selection screen 400 and clicks on the OK button 403, a function restriction information analysis screen 600 shown in FIG. 6 is displayed.

In the function restriction information analysis screen 600, a function restriction information display part 601 displays the function restriction information of each group of users with identical pieces of function restriction information.

In a work flow executor designation part 602, the work flow definer designates users with desired function restriction information as a work flow definition target. Users are exclusively designated. After the work flow for the designated users is defined, work flow definition for the undesignated users may start automatically.

The work flow definer clicks on an OK button 603 upon designating the work flow executor. When the work flow definer clicks on the OK button 603, the designation method selection screen in FIG. 8 to be described hereinafter is displayed.

Figure 7:
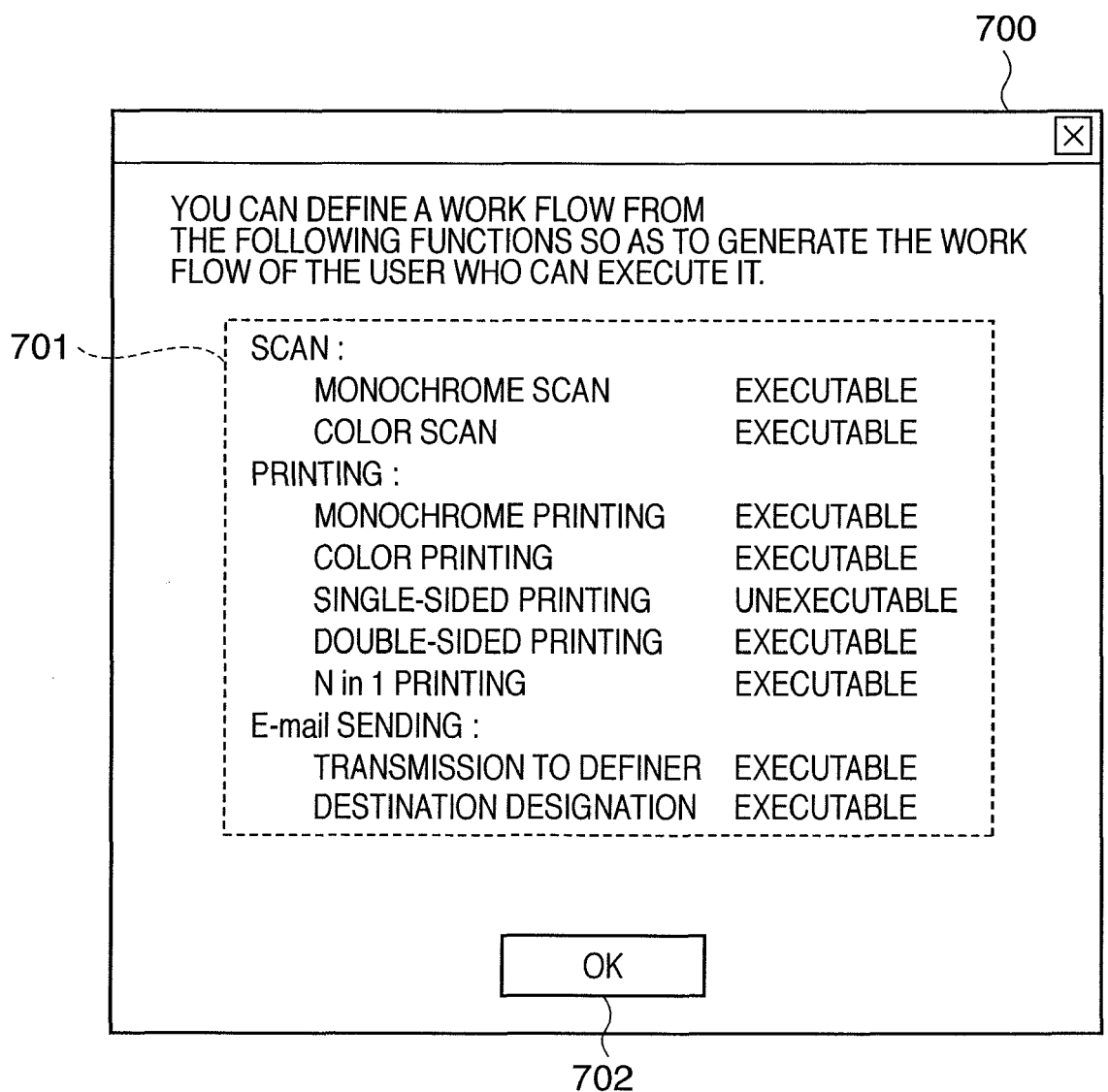
FIG. 7 is a view showing an example of a function restriction information analysis screen in defining a work flow for a user who can execute the work flow according to the embodiment of the present invention.

When the work flow definer selects "Define a work flow on the basis of functions executable by one of the selected users so as to generate the work flow of the user who can execute it" in the work flow definition method selection screen 400 and clicks on the OK button 403, a function restriction information analysis screen 700 shown in FIG. 7 is displayed.

In the function restriction information analysis screen 700, a function restriction information display part 701 displays the function restriction information of users who have the most lenient function restrictions in the plurality of users with different pieces of function restriction information.

For example, color printing is inhibited for the users A and B but permitted for the users C and D. Hence, the function restriction information indicates that color printing is permitted. Similarly, single-sided printing and destination designation of E-mail sending are also permitted by the function restriction information. However, when color printing is designated as a work flow process step, it is registered as a work flow for only the users C and D, who can actually execute color printing, and not registered as a work flow for the users A and B.

The work flow definer clicks on an OK button 702 upon confirming the function restriction information. When the work flow definer clicks on the OK button 702, the designation method selection screen in FIG. 8 to be described hereinafter is displayed.

A designation method selection screen to select an image forming apparatus as a work flow distribution destination will be described next, with reference to FIG. 8.

Figure 8:
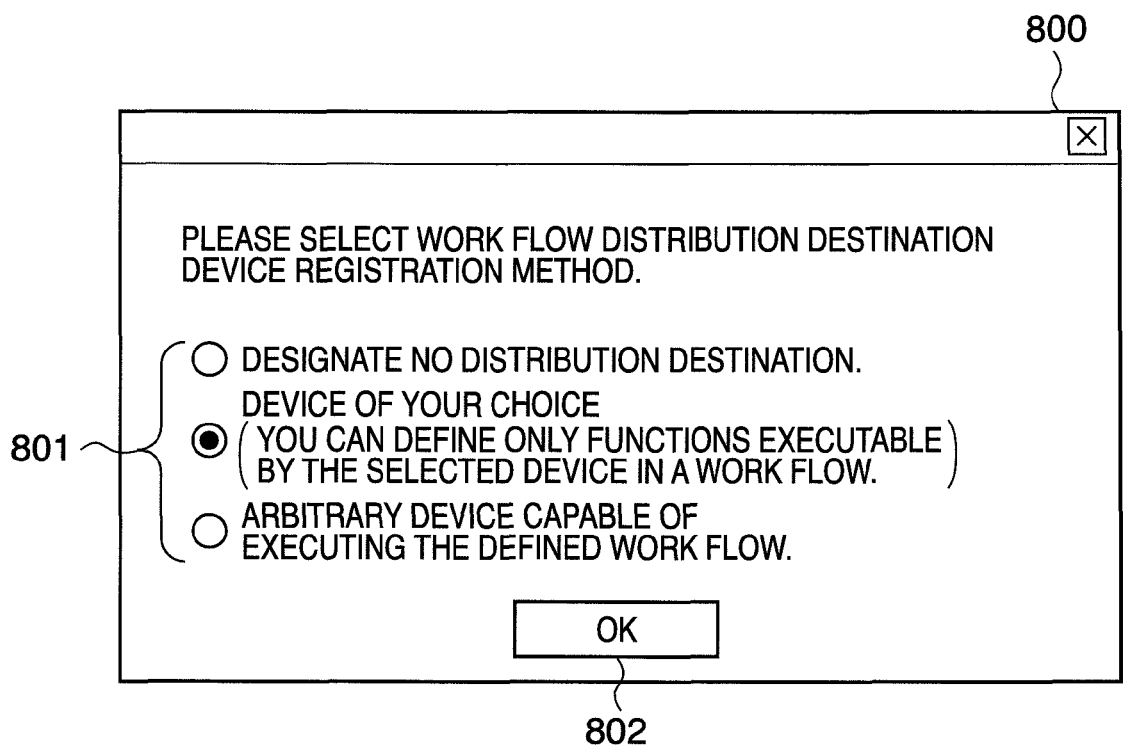
FIG. 8 is a view showing an example of a designation method selection screen to select an image forming apparatus as a work flow distribution destination according to the embodiment of the present invention.

FIG. 8 is a view showing an example of a designation method selection screen to select an image forming apparatus as a work flow distribution destination according to the embodiment of the present invention.

In a designation method selection screen 800, a distribution destination device designation method selection part 801 causes the work flow definer to select how to determine the work flow distribution destination image forming apparatus. In this embodiment, the method can be selected from the following three methods.

"Designate no distribution destination"

"Device of definer's choice"

"Arbitrary device capable of executing the defined work flow"

If "Designate no distribution destination" is selected, the work flow definer executes only work flow generation and designates the distribution destination device by another designation method.

The work flow definer clicks on an OK button 802 upon selecting a method in the distribution destination device designation method selection part 801. When the work flow definer designates "Device of definer's choice", an image forming apparatus selection screen shown in FIG. 9 to be described later is displayed. When the work flow definer designates "Arbitrary device capable of executing the defined work flow", a work flow generation screen shown in FIG. 11A to be described later is displayed. When the work flow definer clicks on the OK button 802, information representing the designated designation method is stored in the RAM.

Figure 9:
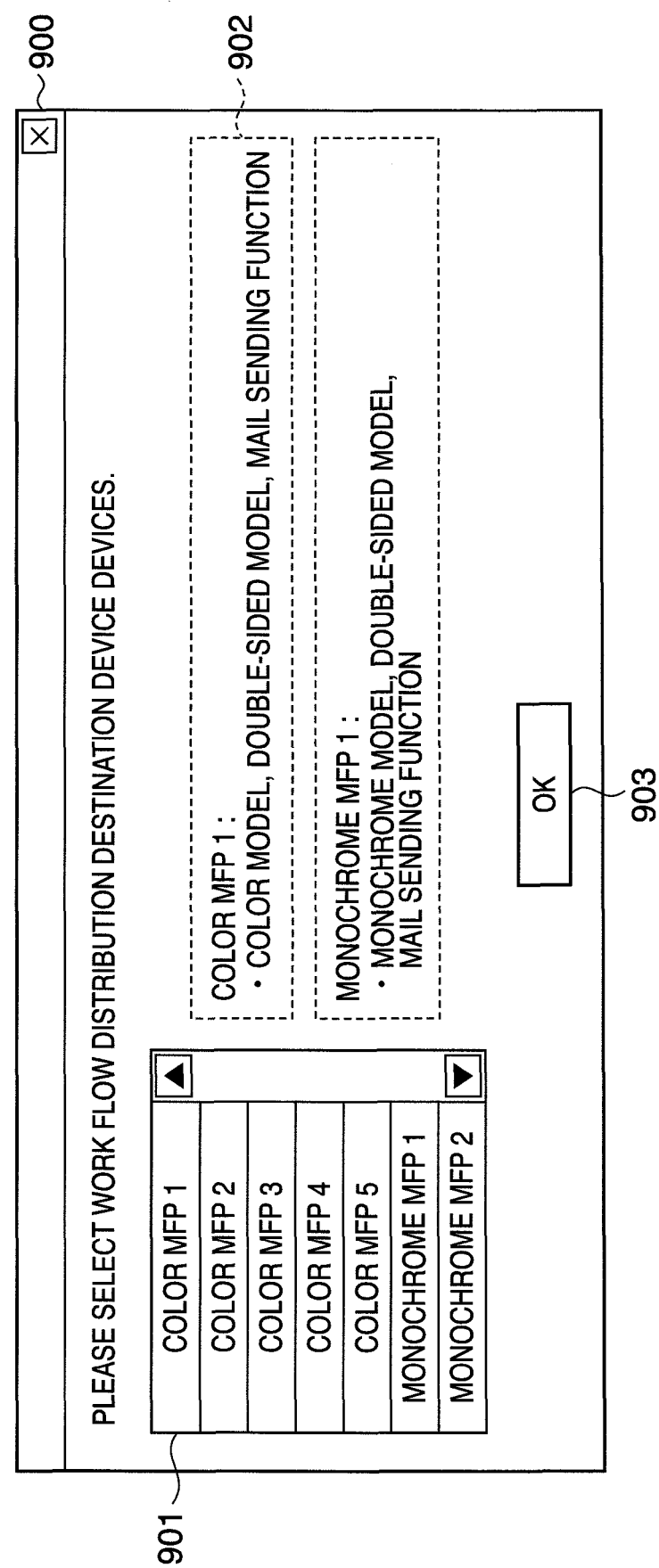
FIG. 9 is a view showing an example of an image forming apparatus selection screen to select a work flow distribution destination according to the embodiment of the present invention.

When the work flow definer selects "Device of definer's choice" in the distribution destination device designation method selection part 801 and clicks on the OK button 802, the image forming apparatus selection screen shown in FIG. 9 is displayed.

An image forming apparatus selection screen 900 functions as a work flow distribution destination device selection screen. In the image forming apparatus selection screen 900, a distribution destination device selection part 901 causes the work flow definer to select an image forming apparatus as a work flow distribution destination.

A device configuration information display part 902 displays the device configuration information of each image forming apparatus selected in the distribution destination device selection part 901. In this embodiment, color MFP 1 and monochrome MFP 1 are selected via the distribution destination device selection part 901.

When the work flow definer selects the work flow distribution destination device and clicks on an OK button 903, a work flow generation screen in FIG. 10 to be described later is displayed. When the work flow definer clicks on the OK button 903, information representing the selected work flow distribution destination device is stored in the RAM.

Figure 10:
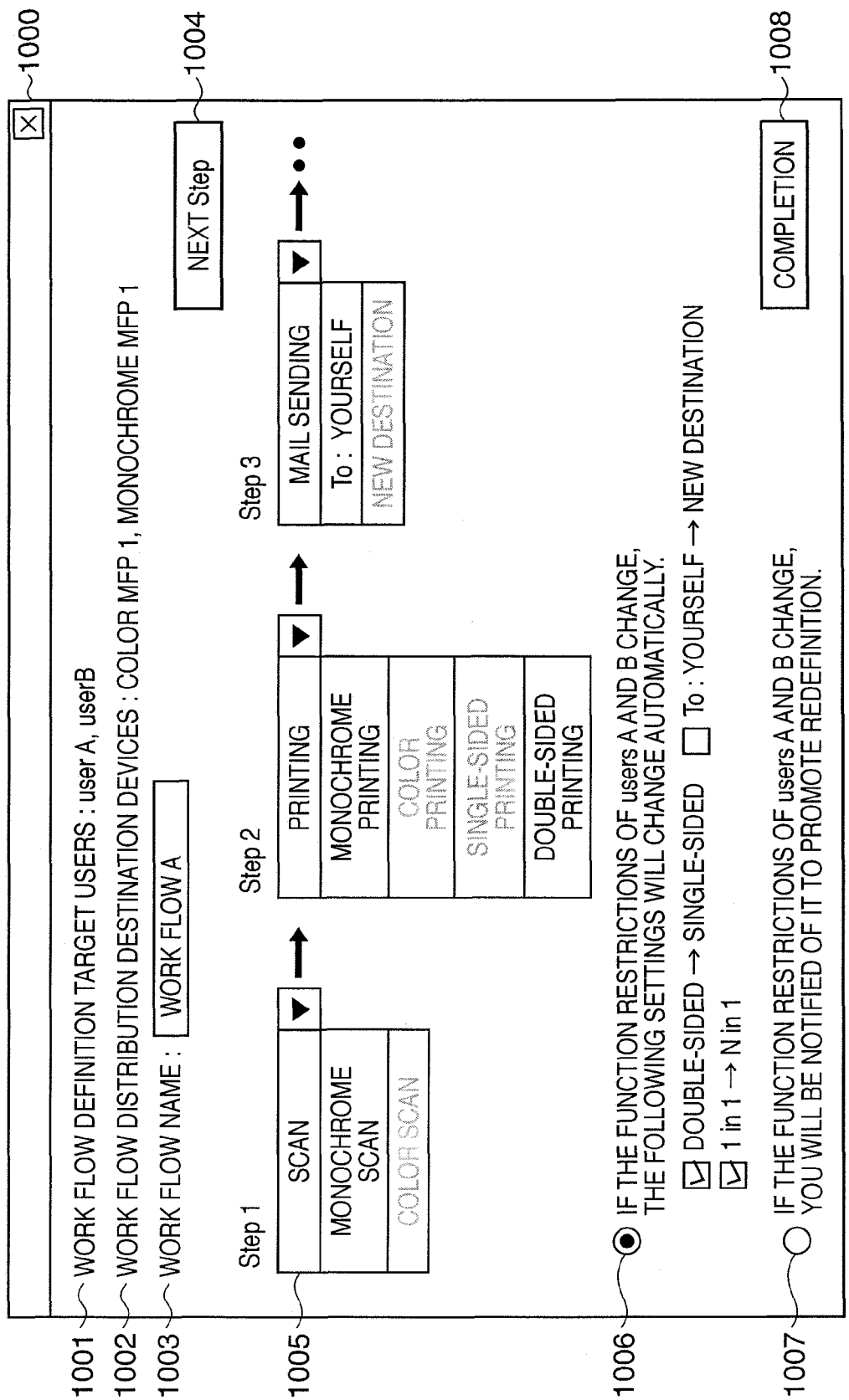
FIG. 10 is a view showing an example of a work flow generation screen according to the embodiment of the present invention.

When the work flow definer selects "Designate no distribution destination" in the distribution destination device designation method selection part 801 in FIG. 8 and clicks on the OK button 802, the work flow generation screen shown in FIG. 10 is displayed. Even when the work flow definer selects a work flow distribution destination device in the distribution destination device selection part 901 in FIG. 9 and clicks on the OK button 903, the work flow generation screen shown in FIG. 10 is displayed.

In a work flow generation screen 1000, users A and B are selected as work flow executors, and color MFP 1 and monochrome MFP 1 are selected as work flow distribution destination devices. FIG. 10 assumes that the function restriction information reflection check box 302 in FIG. 3 has a check mark.

A work flow executor display part 1001 displays users who should execute the generated work flow. A work flow distribution destination device display part 1002 displays the flow distribution destination image forming apparatuses of the generated work flow. The work flow definer inputs the name of the generated work flow in a work flow name input part 1003.

The work flow definer clicks on a "next step" button 1004 to add a work flow process step. FIG. 10 shows a state wherein the scan step, printing step, and mail sending step are selected by clicking on the "next step" button 1004. Any other process step such as HDD saving or FAX can also be added.

A process step definition part 1005 defines the process contents of each process step. In the process steps (Steps 1 to 3), items (process contents) in the pull-down menu are selectable.

In this embodiment, in the scan step (Step 1), the device configuration information indicates that monochrome MFP 1 as the distribution destination device cannot execute color scan. Hence, the item of color scan is grayed out to inhibit selection of it. FIG. 10 shows a state wherein the work flow definer selects monochrome scan.

The control unit 101b controls to disable (inhibit) selection of items that are grayed out. That is, items that are grayed out are displayed in a selection-disabled state to inhibit selection of them. However, the gray-out display is sometimes used as a state indicator to simply indicate a selected/unselected state, as needed.

In the printing step (Step 2), the function restriction information of the users A and B indicates that color printing and single-sided printing are not executable. Hence, the items of color printing and single-sided printing are grayed out to inhibit selection of them. In this way, the client PC 101 displays an operation screen that identifiably displays the process contents executable by the work flow executor in association with the setting target functions to be set in the flow on the basis of the analyzed function restriction information. In accordance with the instruction input via the operation screen, the client PC 101 selects the process contents of the functions to be set in the flow from the executable process contents. In this example, the work flow definer selects monochrome printing and double-sided printing.

Finally, in the mail sending step (Step 3), the function restriction information of the users A and B indicates that new destination is not executable. Hence, the item of new destination is grayed out to inhibit selection of it. In this example, the work flow definer selects "To: definer".

As described above, control is done not to define, in the work flow, unexecutable functions based on the device configuration information of each designated distribution destination device or the function restriction information of each user. This solves the problem that a defined work flow cannot be executed at the time of execution.

When the work flow definer selects "Designate no distribution destination" in the distribution destination device designation method selection part 801, and the work flow generation screen 1000 is displayed, the items of unexecutable processes based on the function restriction information of a user are grayed out in each process step to inhibit selection of them.

An automatic change setting part 1006 is used to do settings to automatically change the process contents of the functions set in the work flow to other process contents when the function restriction information of the work flow executor changes. That is, the automatic change setting part 1006 functions as an acceptance part to accept input of other process contents in place of certain process contents.

The automatic change setting part 1006 reduces the load on the work flow definer because it obviates work flow redefinition even when the function restriction information of the work flow executor changes. If the function restriction changes to enable "single-side printing", the process contents of the work flow can automatically be changed from "double-sided printing" to "single-sided printing".

A redefinition notification setting part 1007 is used to do settings to send a notification to the work flow definer to promote him/her to redefine the work flow if the function restriction information of the work flow executor changes. For example, if automatic change by the automatic change setting part 1006 is not set, and the function restriction information of the users A and B changes to inhibit the mail sending function, the defined work flow A cannot be executed. This problem can be solved by notifying the client PC 101 operated by the work flow definer of the change of function restriction information and causing the work flow definer to redefine the work flow in accordance with the change contents of the function restriction information as soon as possible.

The work flow definer clicks on a completion button 1008 when work flow definition has finished. When the work flow definer clicks on the completion button 1008, information representing various setting contents of the work flow generation screen 1000 is stored in the RAM. That is, the flow generated in accordance with the instruction of the completion button 1008 is registered as the flow of the designated flow executor. The client PC 101 transmits a work flow registration request to the third server 104 on the basis of the information. The registered flow may be transmitted not only to the server but also to the image forming apparatus. If notification to promote redefinition is set, a screen for setting the notification destination is displayed upon clicking on the completion button 1008.

Figure 11A:
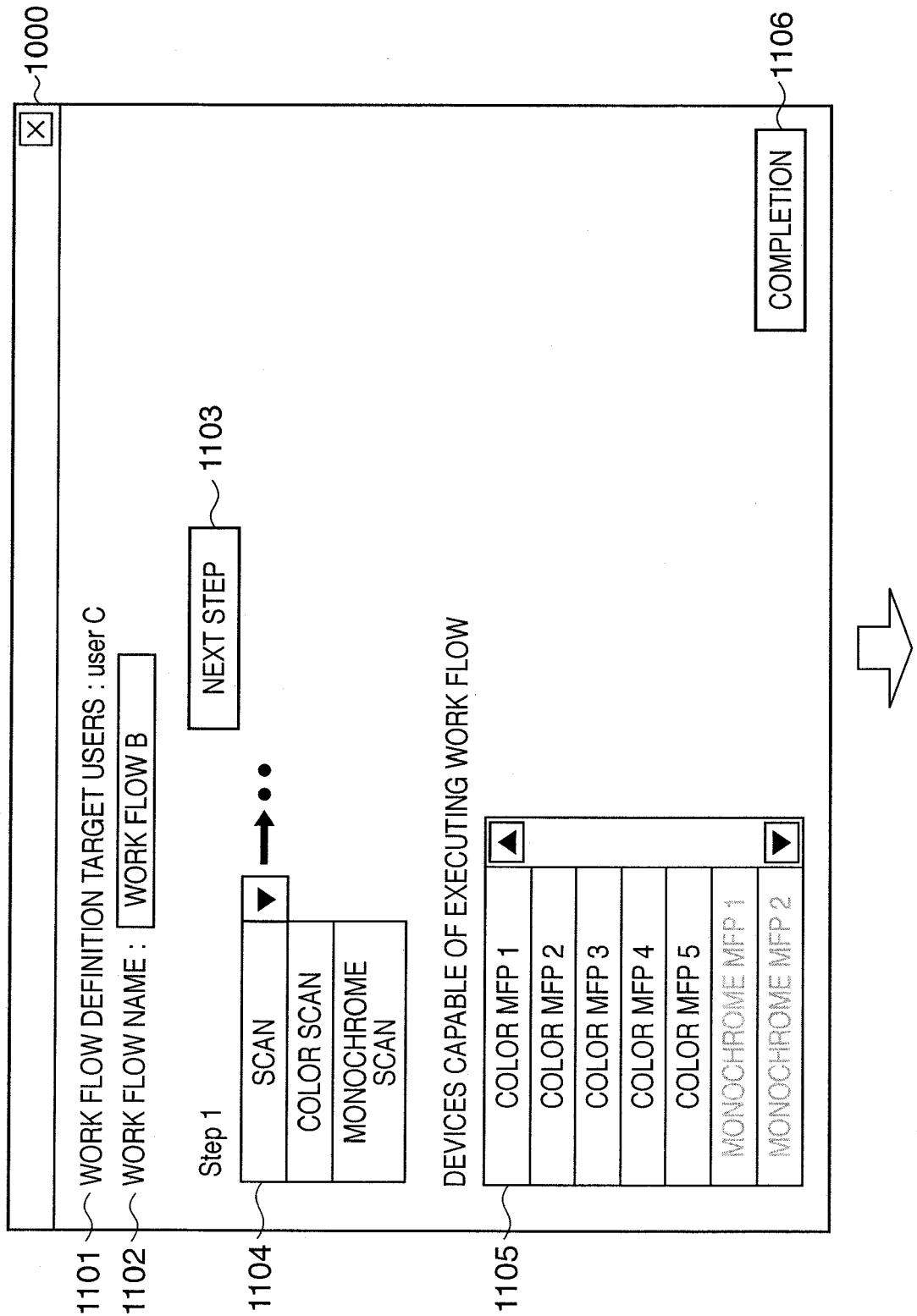

When the work flow definer selects "Arbitrary device capable of executing the defined work flow" in the distribution destination device designation method selection part 801 of the designation method selection screen 800 in FIG. 8 and clicks on the OK button 802, the work flow generation screen shown in FIG. 11A is displayed.

In a work flow generation screen 1100, a work flow executor display part 1101 displays a user (work flow executor) who should execute the generated work flow. FIG. 11A shows the user C having the function restriction information shown in FIG. 4.

The work flow definer inputs the name of the generated work flow in a work flow name input part 1102. The work flow definer clicks on a "next step" button 1103 to add a work flow process step.

A process step definition part 1104 defines the process contents of each process step. Items in the pull-down menu are selectable in each process step.

A work flow executable device display part 1105 displays a list of devices (image forming apparatuses) capable of executing the processes input by the work flow definer. Every time the work flow definer designates a process step, the work flow executable device display part 1105 grays out devices incapable of executing the process on the basis of their device configuration information.

The work flow definer clicks on a completion button 1106 when work flow definition has finished. When the work flow definer clicks on the completion button 1106, information representing various setting contents of the work flow generation screen 1100 is stored in the RAM. The client PC 101 transmits a work flow registration request to the third server 104 on the basis of the information.

The flow of the process FIGS. 11A to 11C will be described next in detail.

Referring to FIG. 11A, before the work flow definer inputs the process step of Step 1, all devices are displayed in the work flow executable device display part 1105 as executable devices. When the work flow definer selects color scan as the process step of Step 1, monochrome MFP 1 and monochrome MFP 2 incapable of executing color scan, as indicated by the device configuration information, are grayed out.

In FIG. 11B, when the work flow definer clicks on the "next step" button 1103 and selects the printing step, single-sided printing that the function restriction information of the user C as the work flow executor inhibits is grayed out. When the work flow definer selects color printing and double-sided printing, color MFP 2 and color MFP 4 incapable of executing double-sided printing, as indicated by the device configuration information, are grayed out.

Figure 11C:
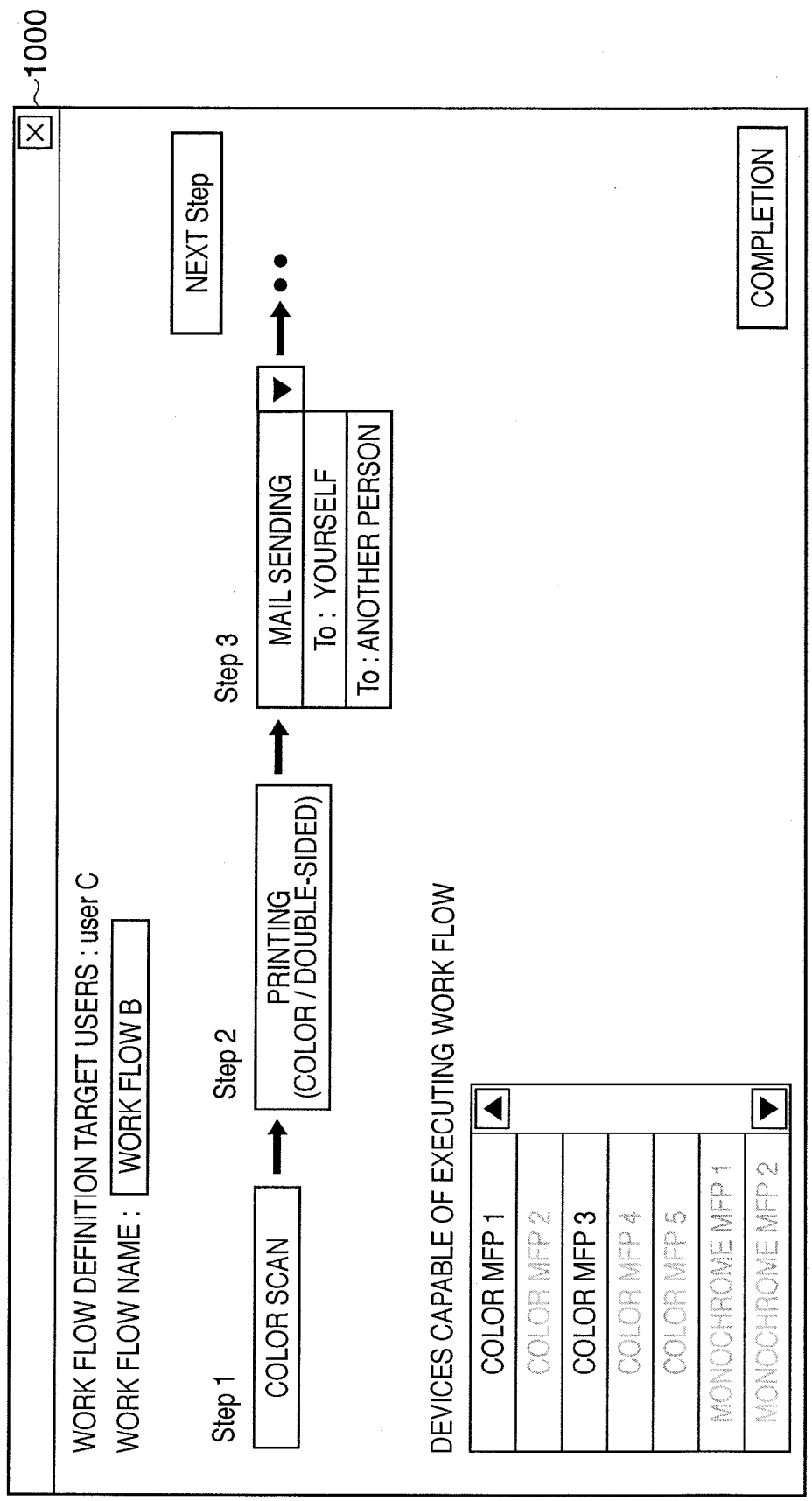

In FIG. 11C, when the work flow definer clicks on the "next step" button 1103 and selects the mail sending step, color MFP 5 having no mail function, as indicated by the device configuration information, is grayed out.

Finally, when the work flow definer clicks on the completion button 1106, the defined work flow is generated as the flow of the user C. Simultaneously, color MFP 1 and color MFP 3 displayed in the work flow executable device display part 1105 are registered as work flow distribution destination devices.

As described above, the display states (normal display (work flow executable)→gray out display (work flow unexecutable)) of the devices displayed in the network 105 are updated in accordance with the selected process step. It is therefore possible to easily select and register devices capable of executing a work flow defined by the work flow definer.

That is, automatically discriminating distribution destination devices capable of executing a defined work flow solves the problem that the device configuration information of a device or the function restriction information of an executor hinders executing a work flow at the time of execution.

The process of the client PC 101 according to this embodiment will be explained next with reference to FIGS. 12A and 12B.

Figure 12A:
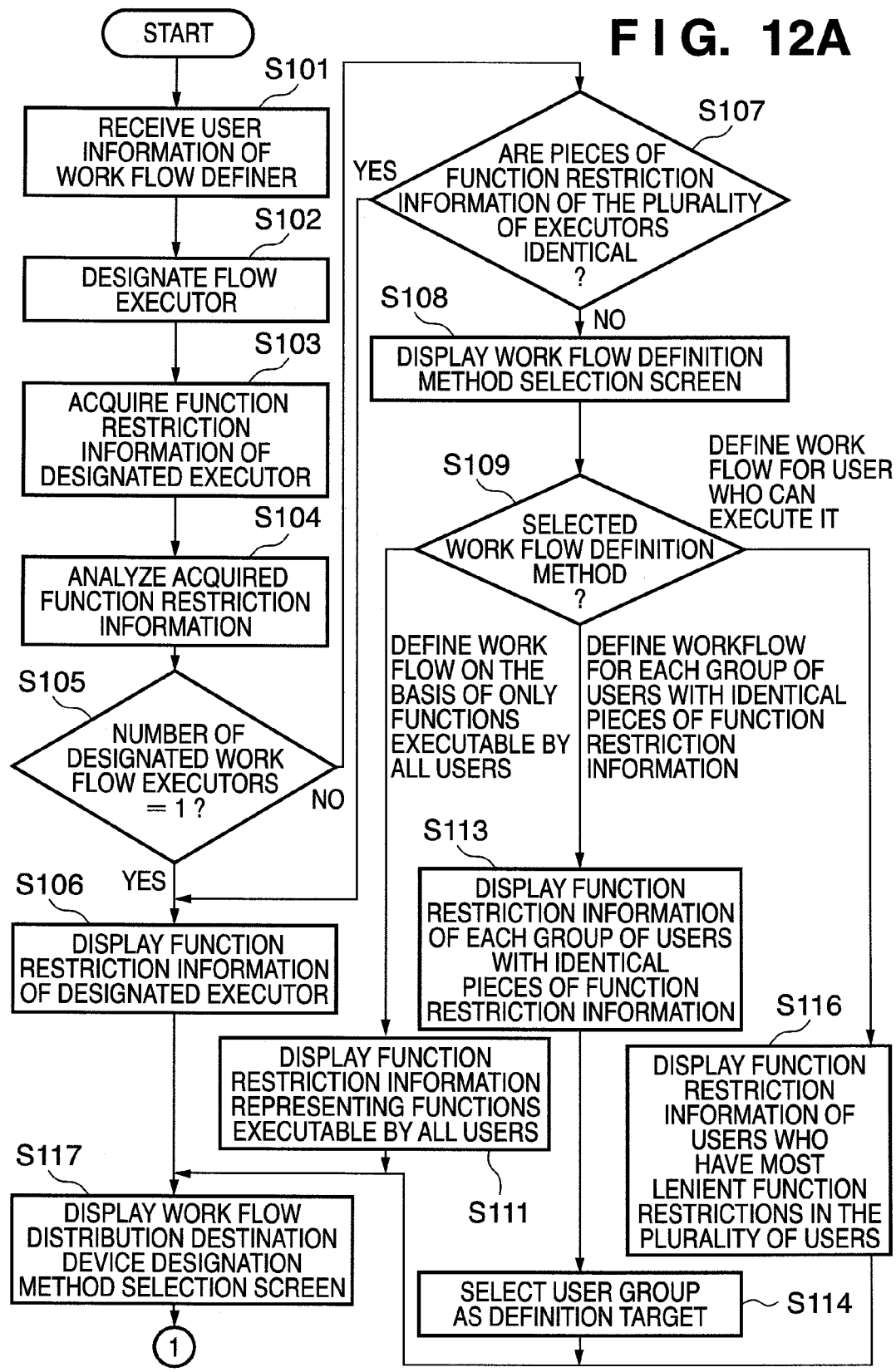
FIG. 12A is a flowchart illustrating a work flow generation process executed by the client PC according to the embodiment of the present invention.
Figure 12B:
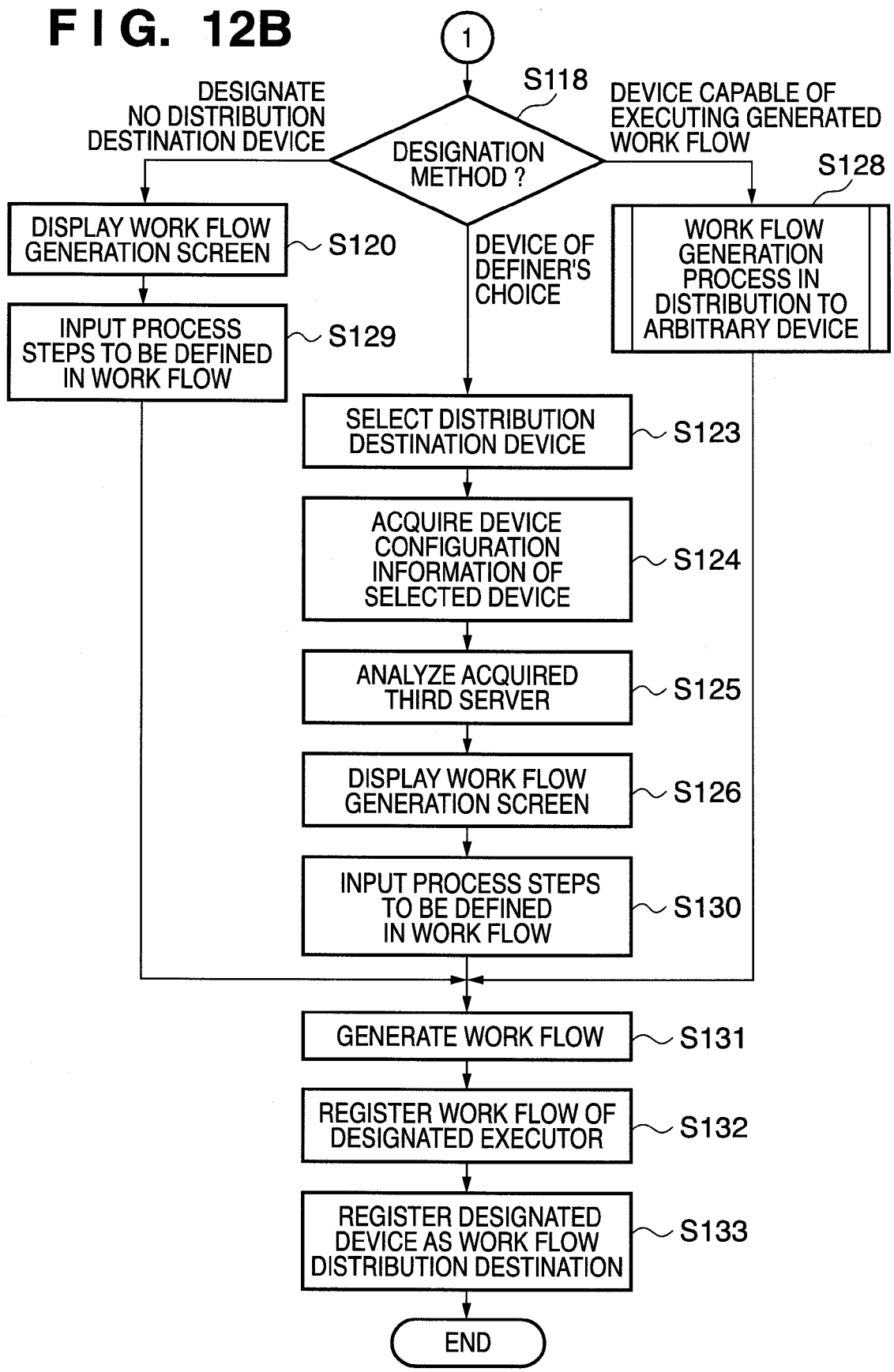
FIG. 12B is a flowchart illustrating a work flow generation process executed by the client PC according to the embodiment of the present invention.

FIGS. 12A and 12B are flowcharts illustrating a work flow generation process executed by the client PC according to the embodiment of the present invention.

Especially, this process is executed when the work flow definer defines a work flow on the client PC 101. This process is implemented by causing the CPU (control unit 101*b*) of the client PC 101 to read out a control program from the ROM and execute it.

First, in step S101, the control unit 101*b* receives the user information of the work flow definer. The user information can be user information input by the work flow definer upon login to the client PC 101 or that input in the authentication screen of the work flow generation application.

In step S102, the control unit 101*b* displays the work flow executor designation screen 200 (FIG. 2) on the display unit 101*d*. The control unit 101*b* designates a work flow executor on the basis of the work flow definer's operation of the operation unit 101*c* in the work flow executor designation screen 200. The presence/absence of the work flow definer's right to designate the work flow executor may be determined by using the third server 104.

In step S103, the control unit 101*b* causes the device configuration information acquisition unit 101*g* to acquire the function restriction information of the designated work flow executor from the first server 102 via the network communication unit 101*a*. In step S104, the control unit 101*b* causes the function restriction information analysis unit 101*f* to analyze the acquired function restriction information.

In step S105, the control unit 101*b* determines on the basis of the analysis result of the function restriction information analysis unit 101*f* whether the number of designated work flow executors is one. If the number of designated work flow executors is one (YES in step S105), the process advances to step S106. In step S106, the control unit 101*b* displays the function restriction information analysis screen 300 (FIG. 3) on the display unit 101*d*.

If the number of designated work flow executors is not one (NO in step S105), the control unit 101*b* determines in step S107 whether the plurality of executors have identical pieces of function restriction information. More specifically, the control unit 101*b* compares the function restriction information of the executors for each setting item. If it is determined that at least one item is different between the pieces of function restriction information, the control unit 101*b* determines that the plurality of executors have different pieces of function restriction information. If the plurality of executors have identical pieces of function restriction information (YES in step S107), the process advances to step S106.

If the plurality of executors have different pieces of function restriction information (NO in step S107), the process advances to step S108. The control unit 101*b* displays the work flow definition method selection screen 400 (FIG. 4) on the display unit 101*d*. The control unit 101*b* receives selection of a work flow definition method on the basis of the work flow definer's operation of the operation unit 101*c* in the work flow definition method selection screen 400.

If the selected work flow definition method is "Define a work flow on the basis of only functions executable by all users" in step S109, the process advances to step S111. In step S111, the control unit 101*b* displays, on the display unit 101*d*, the function restriction information analysis screen 500 (FIG. 5) that displays functions executable by all users. More specifically, the control unit 101*b* compares the function restriction information of the users for each setting item. The control unit 101*b* extracts and displays items executable by all the selected executors.

If the selected work flow definition method is "Define a work flow for each group of users with identical pieces of function restriction information" in step S109, the process advances to step S113. In step S113, the control unit 101*b* displays, on the display unit 101*d*, the function restriction information analysis screen 600 (FIG. 6) that displays groups of users with identical pieces of function restriction information. In step S114, the control unit 101*b* selects work flow executors (user group) as the definition target on the basis of the work flow definer's operation of the operation unit 101*c* in the function restriction information analysis screen 600.

If the selected work flow definition method is "Define a work flow on the basis of functions executable by one of the selected users so as to generate the work flow of the user who can execute it" in step S109, the process advances to step S116. In step S116, the control unit 101*b* displays, on the display unit 101*d*, the function restriction information analysis screen 700 (FIG. 7) that displays the function restriction information of users who have the most lenient function restrictions.

In step S117, the control unit 101*b* displays the work flow distribution destination device (image forming apparatus) designation method selection screen 800 (FIG. 8) on the display unit 101*d*. The control unit 101*b* receives selection of a work flow distribution destination device designation method on the basis of the work flow definer's operation of the operation unit 101*c* in the designation method selection screen 800.

If "Designate no distribution destination device" is selected in step S118, the control unit 101*b* displays the work flow generation screen 1000 (FIG. 10) in step S120. Especially here, unexecutable process steps based on the function restriction information of users are grayed out (selection-disabled). In step S129, the control unit 101*b* inputs process steps to be defined in a work flow on the basis of the work flow definer's operation of the operation unit 101*c* in the work flow generation screen 1000. Unexecutable process steps based on the function restriction information of the selected executors are grayed out (selection-disabled) to inhibit selection by the work flow definer.

If "Device of definer's choice" is selected in step S118, the control unit 101*b* displays the image forming apparatus selection screen 900 (FIG. 9) in step S123. The control unit 101*b* receives selection of distribution destination devices on the basis of the work flow definer's operation of the operation unit 101*c* in the image forming apparatus selection screen 900.

In step S124, the control unit 101*b* causes the device configuration information acquisition unit 101*g* to acquire the device configuration information of each selected distribution destination device. In step S125, the control unit 101*b* causes the device configuration information analysis unit 101*h* to analyze the acquired device configuration information. In step S126, the control unit 101*b* displays the work flow generation screen 1000 (FIG. 10). Especially here, unexecutable process steps based on the function restriction information of users and the device configuration information of devices are grayed out (selection-disabled).

In step S130, the control unit 101b inputs process steps to be defined in a work flow on the basis of the work flow definer's operation of the operation unit 101c in the work flow generation screen 1000. Unexecutable process steps based on both the function restriction information of the selected work flow executors and the device configuration information of the selected device are grayed out (selection-disabled) to inhibit selection by the work flow definer.

If "Arbitrary device capable of executing the defined work flow" is selected in step S118, the control unit 101b executes a work flow generation process in distribution to an arbitrary device. This process will be described later in detail with reference to FIG. 13.

Finally, in step S131, the control unit 101b causes the work flow generation unit 101i to generate a work flow from the selected process steps. That is, the control unit 101b generates the flow of the flow executor by combining the functions of the selected process contents. In step S132, the control unit 101b defines the generated work flow as the work flow of the designated work flow executor and registers information representing it in the third server 104 via the network communication unit 101a. If distribution destination devices are designated, the control unit 101b registers information representing each device serving as a work flow distribution destination in the third server 104 via the network communication unit 101a.

Details of the process in step S128 in FIG. 12B will be described next with reference to FIG. 13.

Figure 13:
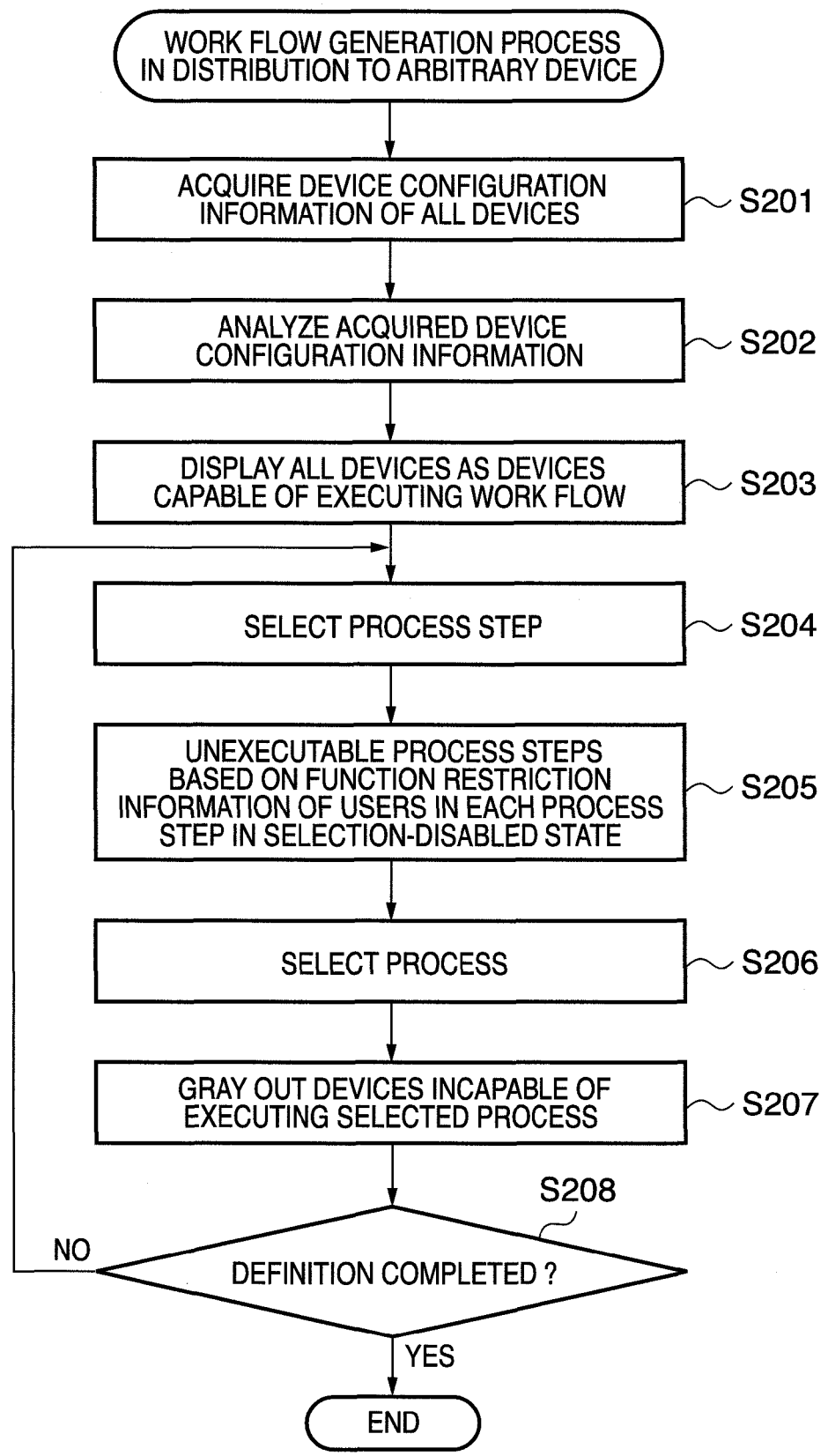
FIG. 13 is a flowchart illustrating details of the process in step S128 according to the embodiment of the present invention.

FIG. 13 is a flowchart illustrating details of the process in step S128 according to the embodiment of the present invention.

First, in step S201, the control unit 101b causes the device configuration information acquisition unit 101g to acquire the device configuration information of all devices from the second server 103. In step S202, the control unit 101b causes the device configuration information analysis unit 101h to analyze the acquired device configuration information. In step S203, the control unit 101b displays the work flow generation screen 1100 (FIG. 11A) on the display unit 101d and displays all devices in the work flow executable device display part 1105.

The device configuration information may be acquired not from the second server 103 but directly from each image forming apparatus. Alternatively, a server including the arrangement of the client PC 101 may hold the device configuration information of all devices, acquire the device configuration information in itself, and generate a work flow.

In step S204, the control unit 101b selects process steps on the basis of the work flow definer's operation of the operation unit 101c in the work flow generation screen 1100. In step S205, the control unit 101b grays out (selection-disables) unexecutable process steps based on the function restriction information of work flow executors in accordance with selection of the process steps.

In step S206, the control unit 101b selects processes of a process step to be processed on the basis of the work flow definer's operation of the operation unit 101c in the work flow generation screen 1100. In step S207, the control unit 101b grays out devices incapable of executing the selected processes on the work flow executable device display part 1105 on the basis of their device configuration information.

With this process, the client PC 101 identifiably displays the process contents executable by the work flow executor in association with the setting target functions to be set in the flow on the basis of the function restriction information and device configuration information. The client PC 101 displays an operation screen in which image forming apparatuses capable of executing the functions to be set in a flow can be identified.

In step S208, the control unit 101b determines whether the work flow definer clicks on the completion button 1106, thereby determining the presence/absence of a definition completion instruction. If no definition completion instruction is input (NO in step S208), the process returns to step S204. If a definition completion instruction is input (YES in step S208), the process returns to step S131 in FIG. 12B. The control unit 101b generates a work flow from the input process steps. In step S132, the control unit 101b defines the work flow as the work flow of the work flow executor and registers information representing it in the third server 104 via the network communication unit 101a. In step S133, the control unit 101b defines each device displayed in the work flow executable device display part 1105 as a work flow distribution destination device and registers information representing each device in the third server 104 via the network communication unit 101a.

As described above, according to this embodiment, in the work flow management system under an environment where restrictions are placed on each user's use of functions of an image forming apparatus, it is possible to efficiency define a work flow reflecting the function restriction information of each user. It is also possible to efficiently define a work flow reflecting not only the function restriction information of each user but also the device configuration information of an image forming apparatus for executing the work flow.

Especially, when the present invention is applied under an environment where an executor whom a definer wants to request to process a work flow is determined, and function restriction information is set for each executor, the definer can easily generate a work flow by combining processes executable by the executor.

In the above-described embodiment, a work flow management system under an environment where an image forming apparatus having a plurality of kinds of functions is used has been exemplified. However, the use target is not limited to the image forming apparatus. The present invention is also applicable to, e.g., a work flow management system under an environment where a device such as a server apparatus having a plurality of kinds of services.

That is, any device that implements a plurality of functions is usable if it can combine them and define a work flow to execute them as a series of processes.

In the above-described embodiment, of items displayed on various kinds of operation screens in, e.g., FIG. 10, selection-inhibited items are grayed out to indicate that they are unselectable. However, the present invention is not limited to this. Any other display form that allows to identify selectable items and unselectable items is usable. For example, selectable items may be displayed with borders surrounding them, blinked, or highlighted (the character size in an item may be increased, or the font type is changed). Unselectable items are grayed out. However, display of them itself may be inhibited.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-227018 filed on Aug. 23, 2006, which is hereby incorporated by reference herein in its entirety.

What is claimed is:

1. An information processing apparatus including at least one processor configured to combine a plurality of functions and to generate a flow to execute the plurality of functions as a series of processes, the information processing apparatus comprising:

a designation unit configured to designate a flow executor to execute a flow;

an acquisition unit configured to acquire function restriction information representing process contents executable by the flow executor designated by said designation unit;

an analysis unit configured to analyze the function restriction information acquired by said acquisition unit;

a display unit configured to display an operation screen that identifiably displays the process contents executable by the flow executor in association with setting target functions to be set in the flow on the basis of the function restriction information analyzed by said analysis unit;

a selection unit configured to select, from the executable process contents, process contents of a setting target function to be set in the flow on the basis of an operation in the operation screen; and a generation unit configured to generate the flow of the flow executor by combining the functions of the process contents selected by said selection unit.

2. The apparatus according to claim 1, further comprising:
a flow registration unit configured to register the flow generated by said generation unit as the flow of the flow executor; and
a transmission unit configured to transmit the flow registered by said flow registration unit to a communicable image forming apparatus.

3. The apparatus according to claim 1, further comprising an acceptance unit configured to accept input of other process contents in place of certain process contents of the function,
wherein said generation unit is configured to change the process contents set in the flow to the process contents designated by said acceptance unit if the function restriction information of the flow executor changes.

4. The apparatus according to claim 1, further comprising a notification unit configured to notify a user of change contents if the function restriction information of the flow executor changes.

5. The apparatus according to claim 1, further comprising:
a flow definition method selection unit configured to receive a selection instruction of a definition method of the flow when said designation unit designates a plurality of flow executors, and said analysis unit determines that the plurality of flow executors have difference pieces of function restriction information; and
an analysis screen generation unit configured to generate, on the basis of the definition method of the flow selected by the selection instruction received by said flow definition method selection unit, an analysis screen that displays an analysis result by said analysis unit,
wherein said display unit is configured to display the screen generated by said analysis screen generation unit.

6. The apparatus according to claim 5, wherein said analysis screen generation unit is configured to generate, on the basis of the definition method of the flow selected by the selection instruction received by said flow definition method selection unit, an analysis screen that identifiably displays process contents executable by the plurality of flow executors designated by said designation unit.

7. The apparatus according to claim 5, wherein said analysis screen generation unit is configured to generate, on the basis of the definition method of the flow selected by the selection instruction received by said flow definition method selection unit, an analysis screen that identifiably displays processes executable by each of groups of flow executors having identical pieces of function restriction information.

8. The apparatus according to claim 5, wherein said analysis screen generation unit is configured to generate, on the basis of the definition method of the flow selected by the selection instruction received by said flow definition method selection unit, an analysis screen that identifiably displays processes executable by at least one of the plurality of flow executors designated by said designation unit.

9. The apparatus according to claim 1, further comprising:
an image forming apparatus selection unit configured to select an image forming apparatus to execute the flow;
a device configuration information acquisition unit configured to acquire device configuration information of the image forming apparatus selected by said image forming apparatus selection unit; and
a device configuration information analysis unit configured to analyze the device configuration information acquired by said device configuration information acquisition unit,
wherein said display unit is configured to display an operation screen that identifiably displays process contents executable by the flow executor and executable by the image forming apparatus selected by said image forming apparatus selection unit in association with the setting target functions to be set in the flow on the basis of the function restriction information and the device configuration information.

10. The apparatus according to claim 9, further comprising an image forming apparatus registration unit configured to register the image forming apparatus selected by said image forming apparatus selection unit as an image forming apparatus to execute the flow generated by said generation unit.

11. The apparatus according to claim 1, further comprising:
a device configuration information acquisition unit configured to acquire device configuration information of at least one image forming apparatus; and
a device configuration information analysis unit configured to analyze the device configuration information acquired by said device configuration information acquisition unit,
wherein said display unit is configured to display an operation screen that identifiably displays the process contents executable by the flow executor and the image forming apparatus capable of executing the setting target functions to be set in the flow in association with the setting target functions to be set in the flow on the basis of the function restriction information and the device configuration information.

12. The apparatus according to claim 11, further comprising image forming apparatus registration unit for registering the image forming apparatus displayed on the operation screen as an image forming apparatus to execute the flow generated by said generation unit upon receiving a generation instruction by said generation unit.

13. A control method of an information processing apparatus which combines a plurality of functions and generates a flow to execute the plurality of functions as a series of processes, comprising the steps of:
designating a flow executor to execute a flow;
acquiring function restriction information representing process contents executable by the flow executor designated in the designating step;
analyzing the function restriction information acquired in the acquiring step;
displaying an operation screen that identifiably displays the process contents executable by the flow executor in association with setting target functions to be set in the flow on the basis of the function restriction information analyzed in the analyzing step;
selecting, from the executable process contents, process contents of a setting target function to be set in the flow on the basis of an operation in the operation screen; and
generating the flow of the flow executor by combining the functions of the process contents selected in the selecting step.

14. A non-transitory computer-readable storage medium storing a computer program configured to cause a computer to execute control of an information processing apparatus which combines a plurality of functions and generates a flow to execute the plurality of functions as a series of processes, by causing the computer to execute a control method comprising the steps of:
designating a flow executor to execute a flow;
acquiring function restriction information representing process contents executable by the flow executor designated in the designating step;
analyzing the function restriction information acquired in the acquiring step;
displaying an operation screen that identifiably displays the process contents executable by the flow executor in association with setting target functions to be set in the flow on the basis of the function restriction information analyzed in the analyzing step;
selecting, from the executable process contents, process contents of a setting target function to be set in the flow on the basis of an operation in the operation screen; and
generating the flow of the flow executor by combining the functions of the process contents selected in the selecting step.

* * * * *